(12) United States Patent
Altman et al.

(10) Patent No.: US 8,861,312 B2
(45) Date of Patent: Oct. 14, 2014

(54) MEMS MICROPHONE

(75) Inventors: Nathan Altman, RaAnana (IL); Ran Raif, Tel-Aviv (IL); Noam Kedem, Moshav Lahish (IL)

(73) Assignee: QUALCOMM Incorporated, San Diego, CA (US)

( * ) Notice: Subject to any disclaimer, the term of this patent is extended or adjusted under 35 U.S.C. 154(b) by 760 days.

(21) Appl. No.: 12/531,075

(22) PCT Filed: Mar. 14, 2008

(86) PCT No.: PCT/IB2008/050946
§ 371 (c)(1),
(2), (4) Date: Feb. 12, 2010

(87) PCT Pub. No.: WO2008/111011
PCT Pub. Date: Sep. 18, 2008

(65) Prior Publication Data
US 2010/0142325 A1    Jun. 10, 2010

Related U.S. Application Data

(60) Provisional application No. 60/906,813, filed on Mar. 14, 2007.

(51) Int. Cl.
*H04R 19/00*    (2006.01)
*G06F 3/043*    (2006.01)
*H04R 19/04*    (2006.01)

(52) U.S. Cl.
CPC ............ *G06F 3/0433* (2013.01); *H04R 19/04* (2013.01)
USPC ............ 367/181; 381/174; 381/189; 381/369

(58) Field of Classification Search
USPC ........... 367/174, 181; 381/174, 369, 189, 354
See application file for complete search history.

(56) References Cited

U.S. PATENT DOCUMENTS

| | | |
|---|---|---|
| 2,567,407 A | 9/1951 | Slaymaker |
| 4,183,011 A | 1/1980 | Massa |
| 4,211,489 A | 7/1980 | Kleinknecht et al. |
| 4,271,490 A | 6/1981 | Minohara et al. |
| 4,297,607 A | 10/1981 | Lynnworth et al. |
| 4,433,399 A | 2/1984 | Massa |

(Continued)

FOREIGN PATENT DOCUMENTS

| | | |
|---|---|---|
| CN | 1434925 A | 8/2003 |
| CN | 1462864 A | 12/2003 |

(Continued)

OTHER PUBLICATIONS

Summons to Attend Oral Proceedings Pursuant to Rule 115(1) EPC Dated Mar. 3, 2011 From the European Patent Office Re.: Application No. 06728180.8.

(Continued)

*Primary Examiner* — Ian J Lobo
(74) *Attorney, Agent, or Firm* — Haynes and Boone, LLP

(57) ABSTRACT

A MEMS microphone comprising:
a) a case with an open front side;
b) a MEMS membrane mounted on one face of a base, the base being mounted inside the case on a substantially closed side; and
c) a mesh covering the front side, substantially transparent acoustically to at least some of a range of operating frequencies at which the microphone is sensitive.

16 Claims, 7 Drawing Sheets

(56) References Cited

U.S. PATENT DOCUMENTS

| | | |
|---|---|---|
| 4,501,186 A | 2/1985 | Ikuma |
| 4,554,834 A | 11/1985 | Prinz et al. |
| 4,576,047 A | 3/1986 | Lauer et al. |
| 4,577,506 A | 3/1986 | Poole et al. |
| 4,630,072 A | 12/1986 | Scardovi et al. |
| 4,641,291 A | 2/1987 | Simmons, Sr. et al. |
| 4,672,592 A | 6/1987 | Skinner |
| 4,814,552 A | 3/1989 | Stefik et al. |
| 4,855,961 A | 8/1989 | Jaffe et al. |
| 4,991,148 A | 2/1991 | Gilchrist |
| 5,062,089 A | 10/1991 | Willard et al. |
| 5,138,159 A | 8/1992 | Takase et al. |
| 5,142,506 A | 8/1992 | Edwards |
| 5,245,863 A | 9/1993 | Kajimura et al. |
| 5,339,259 A | 8/1994 | Puma et al. |
| 5,372,138 A | 12/1994 | Crowley et al. |
| 5,391,197 A | 2/1995 | Burdette et al. |
| 5,394,741 A | 3/1995 | Kajimura et al. |
| 5,402,150 A | 3/1995 | Stiles |
| 5,421,338 A | 6/1995 | Crowley et al. |
| 5,432,346 A | 7/1995 | Nose et al. |
| 5,511,043 A | 4/1996 | Lindberg |
| 5,515,853 A | 5/1996 | Smith et al. |
| 5,517,579 A | 5/1996 | Baron et al. |
| 5,519,686 A | 5/1996 | Yanagisawa et al. |
| 5,524,630 A | 6/1996 | Crowley |
| 5,530,683 A | 6/1996 | Lindberg |
| 5,550,791 A | 8/1996 | Peloquin et al. |
| 5,557,301 A | 9/1996 | D'Aviau de Piolant |
| 5,588,432 A | 12/1996 | Crowley |
| 5,682,445 A | 10/1997 | Smith |
| 5,691,580 A | 11/1997 | Shelby |
| 5,702,629 A | 12/1997 | Cui et al. |
| 5,715,825 A | 2/1998 | Crowley |
| 5,721,721 A | 2/1998 | Yanagisawa et al. |
| 5,750,941 A | 5/1998 | Ishikawa et al. |
| 5,781,661 A | 7/1998 | Hiraiwa et al. |
| 5,840,031 A | 11/1998 | Crowley et al. |
| 5,866,856 A | 2/1999 | Holtzman |
| 5,867,146 A | 2/1999 | Kim et al. |
| 5,913,629 A | 6/1999 | Hazzard |
| 5,977,958 A | 11/1999 | Baron et al. |
| 6,002,387 A | 12/1999 | Ronkka et al. |
| 6,004,269 A | 12/1999 | Crowley et al. |
| 6,111,565 A | 8/2000 | Chery et al. |
| 6,137,621 A | 10/2000 | Wu |
| 6,147,681 A | 11/2000 | Chery et al. |
| 6,151,014 A | 11/2000 | Zloter et al. |
| 6,169,281 B1 | 1/2001 | Chen et al. |
| 6,211,863 B1 | 4/2001 | Chery et al. |
| 6,232,962 B1 | 5/2001 | Davis et al. |
| 6,252,656 B1 | 6/2001 | Wu et al. |
| 6,265,676 B1 | 7/2001 | Zloter et al. |
| 6,282,340 B1 | 8/2001 | Nasu et al. |
| 6,292,177 B1 | 9/2001 | Zloter et al. |
| 6,292,180 B1 | 9/2001 | Lee |
| 6,300,580 B1 | 10/2001 | Shenholtz et al. |
| 6,307,956 B1 | 10/2001 | Black |
| 6,324,292 B1 | 11/2001 | Mitsuhashi et al. |
| 6,367,335 B1 | 4/2002 | Hicks |
| 6,392,230 B1 | 5/2002 | Aita |
| 6,392,330 B1 | 5/2002 | Zloter et al. |
| 6,424,340 B1 | 7/2002 | Holtzman et al. |
| 6,430,342 B1 | 8/2002 | Kim et al. |
| 6,485,413 B1 | 11/2002 | Boppart et al. |
| 6,504,289 B2 | 1/2003 | Toda et al. |
| 6,522,762 B1 | 2/2003 | Mullenborn et al. |
| 6,577,299 B1 | 6/2003 | Schiller et al. |
| 6,594,369 B1 | 7/2003 | Une |
| 6,681,635 B1 | 1/2004 | Van Schaik |
| 6,724,371 B1 | 4/2004 | Shenholtz et al. |
| 6,738,408 B2 | 5/2004 | Abedin |
| 6,745,632 B1 | 6/2004 | Dryer et al. |
| 6,771,006 B2 | 8/2004 | Zloter et al. |
| 6,778,735 B2 | 8/2004 | Miller et al. |
| 6,798,403 B2 | 9/2004 | Kitada et al. |
| 6,816,266 B2 | 11/2004 | Varshneya et al. |
| 6,822,641 B2 | 11/2004 | Shenholtz et al. |
| 6,823,105 B2 | 11/2004 | Zloter et al. |
| 6,831,781 B2 | 12/2004 | Tearney et al. |
| 6,841,742 B2 | 1/2005 | Shenholtz et al. |
| 6,873,415 B2 | 3/2005 | Amonette et al. |
| 7,113,173 B1 | 9/2006 | Bi et al. |
| 7,166,910 B2 * | 1/2007 | Minervini .................. 257/704 |
| 7,301,212 B1 | 11/2007 | Mian et al. |
| 7,336,262 B2 | 2/2008 | Tsuji |
| 8,248,389 B2 | 8/2012 | Raif et al. |
| 2002/0031243 A1 | 3/2002 | Schiller et al. |
| 2002/0060665 A1 | 5/2002 | Sekiguchi et al. |
| 2002/0067663 A1 | 6/2002 | Loeppert et al. |
| 2002/0102004 A1 | 8/2002 | Minervini |
| 2002/0140673 A1 | 10/2002 | Tanaka |
| 2002/0176577 A1 | 11/2002 | Xu |
| 2003/0029707 A1 | 2/2003 | Gillman et al. |
| 2003/0095708 A1 | 5/2003 | Pittel |
| 2003/0112623 A1 | 6/2003 | Yu et al. |
| 2003/0142065 A1 | 7/2003 | Pahlavan |
| 2003/0151596 A1 | 8/2003 | Moyne et al. |
| 2003/0221876 A1 | 12/2003 | Doczy et al. |
| 2004/0000838 A1 | 1/2004 | Toda |
| 2004/0032399 A1 | 2/2004 | Sekiguchi et al. |
| 2004/0046245 A1 | 3/2004 | Minervini |
| 2004/0169439 A1 | 9/2004 | Toda |
| 2004/0170086 A1 | 9/2004 | Mayer et al. |
| 2005/0030297 A1 | 2/2005 | Burstrom et al. |
| 2005/0077102 A1 | 4/2005 | Banter et al. |
| 2005/0150697 A1 | 7/2005 | Altman et al. |
| 2007/0071268 A1 | 3/2007 | Harney et al. |
| 2007/0189568 A1 * | 8/2007 | Wilk et al. .................. 381/355 |
| 2007/0205492 A1 | 9/2007 | Wang et al. |
| 2008/0084789 A1 | 4/2008 | Altman |
| 2008/0166048 A1 | 7/2008 | Raif et al. |
| 2012/0086675 A1 | 4/2012 | Raif et al. |

FOREIGN PATENT DOCUMENTS

| | | | |
|---|---|---|---|
| CN | 26122094 | 4/2004 | |
| CN | 1883242 A | 12/2006 | |
| DE | 19605366 A1 * | 12/1996 | .............. H01J 65/04 |
| DE | 19701344 | 7/1997 | |
| EP | 0312481 | 4/1989 | |
| EP | 0666543 | 8/1995 | |
| EP | 1450296 | 8/2004 | |
| EP | 1504330 | 8/2006 | |
| EP | 1755360 | 2/2007 | |
| GB | 2043899 | 10/1980 | |
| GB | 2121174 | 12/1983 | |
| JP | 53-117466 | 10/1978 | |
| JP | 57-108769 | 7/1982 | |
| JP | 58123699 U | 8/1983 | |
| JP | 61-176331 | 8/1986 | |
| JP | 63-106585 | 5/1988 | |
| JP | 01-046672 | 2/1989 | |
| JP | 07-255764 | 10/1995 | |
| JP | 07-287632 | 10/1995 | |
| JP | 08-129446 | 5/1996 | |
| JP | 08-321670 | 12/1996 | |
| JP | 09-243343 | 9/1997 | |
| JP | 09-305306 | 11/1997 | |
| JP | 11-237950 | 8/1999 | |
| JP | 2000-125387 | 4/2000 | |
| JP | 2001-42888 | 2/2001 | |
| JP | 2001-054196 | 2/2001 | |
| JP | 2001-245394 | 9/2001 | |
| JP | 2001-518209 | 10/2001 | |
| JP | 2002-91472 | 3/2002 | |
| JP | 2002-132436 | 5/2002 | |
| JP | 2003177042 A | 6/2003 | |
| JP | 2004007330 A | 1/2004 | |
| JP | 2004037468 A | 2/2004 | |
| JP | 2004-070887 | 3/2004 | |
| JP | 2004-164505 | 6/2004 | |
| JP | 2005-174190 | 6/2005 | |
| JP | 2005-518657 | 6/2005 | |

(56) References Cited

FOREIGN PATENT DOCUMENTS

| JP | 2005-183437 | 7/2005 |
|---|---|---|
| JP | 2006157777 A | 6/2006 |
| JP | 2007-060661 | 3/2007 |
| JP | 2007-104582 | 4/2007 |
| KR | 1997-60988 | 8/1997 |
| KR | 2004009625 | 1/2004 |
| KR | 20040006769 | 1/2004 |
| KR | 1020040006769 | 1/2004 |
| KR | 1020040009625 | 1/2004 |
| TW | 394833 | 6/2000 |
| TW | 235010 | 6/2005 |
| TW | 235010 B | 6/2005 |
| WO | WO 97/33145 | 9/1997 |
| WO | WO 00/13039 | 3/2000 |
| WO | WO 00/21020 | 4/2000 |
| WO | WO 00/21203 | 4/2000 |
| WO | WO 01/35329 | 5/2001 |
| WO | WO 02/01466 | 1/2002 |
| WO | WO 03/001358 | 1/2003 |
| WO | WO 03/027643 | 4/2003 |
| WO | WO 03/069547 | 8/2003 |
| WO | WO 03/088136 | 10/2003 |
| WO | WO 2004/010592 | 1/2004 |
| WO | WO 2005/111653 | 11/2005 |
| WO | 2006100682 A2 | 9/2006 |
| WO | WO 2006/100682 | 9/2006 |
| WO | WO 2007/004119 | 1/2007 |
| WO | WO-2007018343 A1 | 2/2007 |
| WO | WO-2007022179 A2 | 2/2007 |
| WO | WO-2007129787 A1 | 11/2007 |
| WO | WO 2008/111011 | 9/2008 |

OTHER PUBLICATIONS

Official Action Dated Feb. 17, 2011 From the US Patent and Trademark Office Re. U.S. Appl. No. 11/884,894.
Examination Report Dated Feb. 28, 2011 From the Intellectual Property Office of New Zealand Re. Application No. 580288.
Examiner's Report Dated May 3, 2010 From the Australian Government, IP Australia Re.: Application No. 2006225986.
Official Action Dated Jun. 9, 2010 From the US Patent and Trademark Office Re.: U.S. Appl. No. 11/596,625.
Official Action Dated Jun. 25, 2010 From the US Patent and Trademark Office Re.: U.S. Appl. No. 10/510,228.
Examination Report Dated Feb. 19, 2010 From the Intellectual Property Office of New Zealand Re.: Application No. 562665.
Response Dated Jul. 26, 2010 to Examination Report of Feb. 19, 2010 From the Intellectual Property Office of New Zealand Re.: Application No. 562665.
Official Action Dated Dec. 28, 2011 From the US Patent and Trademark Office Re.: U.S. Appl. No. 11/884,894.
Response Dated Dec. 20, 2011 to Examination Report of Feb. 28, 2011 From the Intellectual Property Office of New Zealand Re. Application No. 580288.
Response Dated Sep. 26, 2011 to Examination Report of Feb. 28, 2011 From the Intellectual Property Office of New Zealand Re. Application No. 580288.
Translation of Decision on Rejection Dated Nov. 24, 2011 From the State Intellectual Property Office of the People's Republic of China Re.: Application No. 200680017983.3.
Examination Report Dated Jan. 6, 2012 From the Intellectual Property Office of New Zealand Re. Application No. 580288.
Response Dated Apr. 22, 2010 to Communication Pursuant to Article 94(3) EPC of Jan. 8, 2010 From the European Patent Office Re.: Application No. 08719694.5.
Translation of Official Query Dated Apr. 20, 2010 From the Japanese Patent Office Re.: Application No. 2003-584999.
Examination Report Dated Jan. 6, 2012 From the Intellectual Property Office of New Zealand Re. Application No. 597258.
Restriction Official Action Dated Jan. 25, 2012 From the US Patent and Trademark Office Re. U.S. Appl. No. 12/984,617.
Communication Pursuant to Article 94(3) EPC Dated Jan. 25, 2012 From the European Patent Office Re. Application No. 11156827.5.
Communication Under Rule 71(3) EPC Dated Jul. 29, 2011 From the European Patent Office Re.: Application No. 06728180.8.
Response Dated Dec. 2, 2011 to the Requisition by the Examiner of Jun. 3, 2011 From the Canadian Intellectual Property Office Re. Application No. 2,481,643.
Response Dated Jul. 26, 2010 to Official Action of Jun. 9, 2010 From the US Patent and Trademark Office Re.: U.S. Appl. No. 11/596,625.
Restriction Official Action Dated Feb. 16, 2012 From the US Patent and Trademark Office Re. U.S. Appl. No. 12/984,618.
Translation of Official Query Dated Feb. 24, 2012 From the Japanese Patent Office Re. Application No. 2007-517644.
Invitation Pursuant to Rule 62a(1) EPC Dated Mar. 23, 2011 From the European Patent Office Re. Application No. 11156827.5.
Response Dated Mar. 17, 2011 to Official Action of Feb. 17, 2011 From the US Patent and Trademark Office Re. U.S. Appl. No. 11/884,894.
Response Dated Feb. 27, 2011 to Communication Pursuant to Article 94(3) EPC of Nov. 26, 2010 From the European Patent Office Re.: Application No. 08719694.5.
Response Dated Jan. 17, 2011 to Requisition by the Examiner of Sep. 7, 2010 From the Canadian Intellectual Property Office Re. Application No. 2,481,643.
Examiner's Report Dated Oct. 30, 2008 From the Australian Government, IP Australia Re.: Application No. 2005243022.
International Preliminary Report on Patentability Dated Mar. 14, 2007 From the International Preliminary Examining Authority Re.: Application No. PCT/IL2005/000509.
International Preliminary Report on Patentability Dated Aug. 27, 2007 From the International Preliminary Examining Authority Re.: Application No. PCT/IL2006/000373.
Official Action Dated Jul. 10, 2008 From the US Patent and Trademark Office Re.: U.S. Appl. No. 10/510,228.
Communication Pursuant to Article 94(3) EPC Dated Mar. 6, 2009 From the European Patent Office Re.: Application No. 06728180.8.
Communication Pursuant to Article 94(3) EPC Dated Sep. 10, 2009 From the European Patent Office Re.: Application No. 06728180.8.
Communication Relating to the Results of the Partial International Search Report Dated Sep. 18, 2008 From the International Searching Authority Re.: Application No. PCT/IB2008/050946.
Examination Report Dated Sep. 6, 2006 From the Intellectual Property Office of New Zealand Re.: Application No. 535953.
Examination Report Dated Jul. 7, 2009 From the Intellectual Property Office of New Zealand Re.: Application No. 562665.
Examination Report Dated Jul. 29, 2009 From the Government of India, Patent Office Re.: Application No. 2344/CHENP/2004.
Examiner's Report Dated Dec. 14, 2007 From the Australian Government, IP Australia Re.: Application No. 2003219506.
First Written Opinion Dated Oct. 29, 2004 From the International Preliminary Examining Authority Re.: Application No. PCT/IL03/00309.
International Preliminary Examination Report Dated Apr. 26, 2005 From the International Preliminary Examining Authority Re.: Application No. PCT/IL03/00309.
International Preliminary Report on Patentability Dated Sep. 24, 2009 From the International Bureau of WIPO Re.: Application No. PCT/IB2008/050946.
International Search Report Dated Aug. 2, 2006 From the International Searching Authority Re.: Application No. PCT/IL2005/000509.
International Search Report Dated Dec. 16, 2008 From the International Searching Authority Re.: Application No. PCT/IB2008/050946.
International Search Report Dated Apr. 18, 2007 From the International Searching Authority Re.: Application No. PCT/IL2006/000373.
International Search Report Dated Sep. 22, 2004 From the International Searching Authority Re. Application No. PCT/IL03/00309.
Notice of the Reason for Rejection Dated May 1, 2009 From the Korean Intellectual Property Office Re.: Applicaiton No. 2004-7016511 and Its Translation Into English.

(56) References Cited

OTHER PUBLICATIONS

Office Action Dated Jun. 2, 2006 From the State Intellectual Property Office of the People's Republic of China Re.: Application No. 03813673.2.
Attisano et al. "Signal Transduction by the TGF-β Superfamily", Science, 296(5573): 1646-1647, 2002.
Observations as Part of a Response Dated Jan. 3, 2011 to Communication Pursuant to Article 94(3) EPC of Jul. 14, 2010 From the European Patent Office Re. Application No. 06728180.8.
Official Action Dated Dec. 17, 2010 From the US Patent and Trademark Office Re.: U.S. Appl. No. 10/510,228.
Communication Pursuant to Rules 70(2) and 70a(2) EPC and Reference to Rule 39(1) EPC Dated Jan. 11, 2011 From the European Patent Office Re. Application No. 10162182.9.
Examiner's Report Dated Feb. 16, 2011 From the Australian Government, IP Australia Re. Application No. 2008224542.
Translation of Official Copy of Decision of Rejection Dated Apr. 19, 2011 From the Japanese Patent Office Re. Application No. 2007-517644.
European Search Report and the European Search Opinion Dated Jun. 14, 2011 From the European Patent Office Re. Application No. 11156827.5.
Claims and Observations in Response Dated May 30, 2011 to Summons to Attend Oral Proceedings Pursuant to Rule 115(1) EPC of Mar. 3, 2011 From the European Patent Office Re.: Application No. 06728180.8.
Official Action Dated May 23, 2011 From the US Patent and Trademark Office Re.: U.S. Appl. No. 11/884,894.
Communication Pursuant to Rules 70(2) and 70a(2) EPC and References to Rule 39(1) EPC Dated Jul. 18, 2011 From the European Patent Office Re. Application No. 11156827.5.
Requisition by the Examiner Dated Jun. 3, 2011 From the Canadian Intellectual Property Office Re. Application No. 2,481,643.
Communication Pursuant to Article 94(3) EPC Dated Jul. 26, 2011 From the European Patent Office Re. Application No. 10162182.9.
Response Dated Jul. 4, 2011 to the Communication Pursuant to Rules 70(2) and 70a(2) EPC and Reference to Rule 39(1) EPC of Jan. 11, 2011 From the European Patent Office Re. Application No. 10162182.9.
Response Dated Jun. 22, 2011 to Official Action of May 23, 2011 From the US Patent and Trademark Office Re.: U.S. Appl. No. 11/884,894.
Examiner's Report Dated Jun. 27, 2011 From the Australian Government, IP Australia Re. Application No. 2006225986.
Response Dated Aug. 3, 2011 to Examiner's Report of Jun. 27, 2011 From the Australian Government, IP Australia Re. Application No. 2006225986.
Response Dated Jun. 8, 2011 to Examiner's Report of May 3, 2010 From the Australian Government, IP Australia Re.: Application No. 2006225986.
Official Action Dated Aug. 11, 2011 From the US Patent and Trademark Office Re. U.S. Appl. No. 11/884,894.
Response Dated Sep. 15, 2011 to Official Action of Aug. 11, 2011 From the US Patent and Trademark Office Re. U.S. Appl. No. 11/884,894.
Response Dated Sep. 18, 2011 to Office Action of May 24, 2011 From the Israel Patent Office Re. Application No. 186083.
Response Dated Sep. 26, 2011 to Examiner's Report of Feb. 16, 2011 From the Australian Government, IP Australia Re. Application No. 2008224542.
Translation of Notice of Reason for Rejection Dated Oct. 4, 2011 From the Japanese Patent Office Re. Application No. 2008-502561.
Translation of Notice of Reason for RejectionDated Nov. 25, 2011 From the Japanese Patent Office Re. Application No. 2009-101044.
Examination Report Dated Jun. 5, 2012 From the Intellectual Property Office of New Zealand Re. Application No. 580288.
Notice of Allowance Dated May 16, 2012 From the US Patent and Trademark Office Re.: U.S. Appl. No. 11/884,894.
Translation of Notice of Reason for Rejection Dated Dec. 13, 2011 From the Japanese Patent Office Re. Application No. 2009-553264.

Office Action Dated May 30, 2012 From the Israel Patent Office Re. Application No. 200938 and Its Translation Into English.
Restriction Official Action Dated Jun. 5, 2012 From the US Patent and Trademark Office Re. U.S. Appl. No. 13/329,361.
Translation of Official Copy of Decision of Rejection Dated May 15, 2012 From the Japanese Patent Office Re. Application No. 2009-553264.
Office Action Dated Mar. 27, 2012 From the Israel Patent Office Re. Application No. 186083 and Its Translation Into English.
Translation of Notice of Reason for Rejection Dated Sep. 10, 2010 From the Japanese Patent Office Re. Application No. 2007-517644.
Notice of Allowance Dated Aug. 5, 2010 From the US Patent and Trademark Office Re.: U.S. Appl. No. 11/596,625.
Examination Report Dated Oct. 12, 2005 From the Intellectual Property Office of New Zealand Re.: Application No. 535953.
Examination Report Dated Sep. 26, 2008 From the Government of India, Patent Office Re.: Application No. 2344/CHENP/2004.
Official Action Dated Feb. 10, 2009 From the US Patent and Trademark Office Re.: U.S. Appl. No. 10/510,228.
International Search Report and the Written Opinion Dated Dec. 16, 2008 From the International Searching Authority Re.: Application No. PCT/IB2008/050946.
Official Action Dated Jul. 10, 2008 From the United States Patent and Trademark Office Re:. U.S. Appl. No. 10/510,228.
Official Action Dated Jul. 14, 2009 From the US Patent and Trademark Office Re.: U.S. Appl. No. 10/510,228.
Official Action Dated Mar. 19, 2008 From the US Patent and Trademark Office Re.: U.S. Appl. No. 10/510,228.
Official Action Dated Nov. 26, 2007 From the US Patent and Trademark Office Re.: U.S. Appl. No. 10/510,228.
Official Copy of Decision of Rejection Dated Dec. 19, 2008 From the Japanese Patent Office Re.: Application No. 2003-584999 and its Translation into English.
Second Written Opinion Dated Dec. 27, 2004 From the International Preliminary Examining Authority Re.: Application No. PCT/IL03/00309.
Translation of Notice of Final Rejection Dated Dec. 9, 2009 From the Korean Intellectual Property Office Re.: Application No. 2004-7016511.
Translation of Notice of Reason for Rejection Dated May 2, 2008 From the Japanese Patent Office Re.: Application No. 2003-584999.
Translation of Office Action Dated Jan. 9, 2009 From the State Intellectual Property Office of the People' Republic of China Re.: Application No. 200680017983.3.
Translation of Office Action Dated Feb. 13, 2009 From the State Intellectual Property Office of the People's Republic of China Re.: Application No. 200580023798.0.
Translation of Office Action Dated Jul. 17, 2009 From the State Intellectual Property Office of the People's Republic of China Re.: Application No. 200680017983.3.
Translation of Office Action Dated Oct. 31, 2008 From the Patent Office of the People's Republic of China Re.: Application No. 200580023798.0.
Translation of the Office Action Dated Sep. 27, 2005 From the National Bureau of Standards, Ministry of Economic Affairs of Taiwan Re.: Application No. 92128407.
Translation of the Office Action Dated Oct. 31, 2008 From the State Intellectual Property Office of the People's Republic of China Re.: Application No. 200580023798.0.
Translation of the Official Letter Dated Dec. 17, 2004 From the National Bureau of Standards, Ministry of Economic Affairs of Taiwan Re.: 92128407.
Written Opinion Dated Aug. 2, 2006 From the International Searching Authority Re.: Application No. PCT/IL2005/000509.
Written Opinion Dated Apr. 12, 2007 From the International Searching Authority Re.: Application No. PCT/IL2006/000373.
Written Opinion Dated Dec. 16, 2008 From the International Searching Authority Re.: Application No. PCT/IB2008/050946.
Cai et al. "A Study on Packaging of PZT MEMS Microphone", 2005 Electronics Components and Technology Conference, Lake Buena Vista, FL, USA, XP002488699, p. 1077-1080, Jun. 3, 2005. Retrieved From the Internet: URL:http://ieeexplore.ieee.org/ie15/9844/31024/01441405.pdf>.

(56) References Cited

OTHER PUBLICATIONS

Junge et al. "Simulation of Capacitive Micromachined Ultrasonic Transducers (cMUT) for Low Frequencies and Silicon Condenser Microphones Using an Analytical Model", Proceedings of the IEEE Ultrasonic Symposium, Honolulu, Hawaii, Oct. 5, 2005, XP010701172, 1: 485-488, Oct. 5, 2005. p. 487.
Neumann Jr. et al. "CMOS-MEMS Membrane for Audio-Frequency Acoustic Actuation", Sensors and Actuators A, XP004377889, 95(2-3): 175-182, Jan. 1, 2002. p. 175, 182.
Nicolet et al. "Desulfovibrio Desulfuricans Iron Hydrogenase: The Structure Shows Unusual Coordination to an Active Site Fe Binuclear Center", Structure, 7: 13-23, 1999.
Nonaka et al. "Ultrasonic Position Measurement and Its Applications to Human Interface", Instrumentation and Measurement Technology Conference, IMTC/94, Conference Proceedings, 10th Anniversary, Advanced Technologies in I & M, IEEE Hamatsu, Japan, IEEE New York, USA, XP010121966, p. 753-756, 1994.
Peters et al. "X-Ray Crystal Structure of the Fe-Only Hydrogenase (Cpl) From *Clostridium pasteurianum* to 1.8 Angstrom Resolution", Science, 282: 1853-1858, 1998.
Communication Pursuant to Article 94(3) EPC Dated Jan. 8, 2010 From the European Patent Office Re.: Application No. 08719694.5.
Official Action Dated Jan. 15, 2010 From the US Patent and Trademark Office Re.: U.S. Appl. No. 10/510,228.
Official Action Dated Feb. 22, 2010 From the US Patent and Trademark Office Re.: U.S. Appl. 11/596,625.
Response Dated Jan. 17, 2010 to Communication Pursuant to Article 94(3) EPC of Sep. 10, 2009 From the european Patent Office Re.: Application No. 06728180.8.
Response Dated Feb. 18, 2010 to Notice of Final Rejection of Dec. 9, 2009 From the Korean Intellectual Property Office Re.: Application No. 2004-7016511.
Response Dated Dec. 29, 2009 to Examination Report of Jul. 7, 2009 From the Intellectual Property Office of New Zealand Re.: Application No. 562665.
Response Dated Jun. 29, 2010 to Official Query of Apr. 20, 2010 From the Japanese Patent Office Re.: Application No. 2003-584999.
Translation of Office Action Dated Jun. 9, 2010 From the State Intellectual Property Office of the People's Republic of China Re.: Application No. 200680017983.3.
Communication Pursuant to Article 94(3) EPC Dated Jul. 14, 2010 From the European Patent Office Re. Application No. 06728180.8.
Communication Pursuant to Article 96(2) EPC Dated Nov. 18, 2005 From the European Patent Office Re.: Application No. 03811473.2.
Response Dated Sep. 27, 2010 to Official Action of Jun. 25, 2010 From the US Patent and Trademark Office Re.: U.S. Appl. No. 10/510,228.
Communication Pursuant to Article 94(3) EPC Dated Nov. 26, 2010 From the European Patent Office Re.: Application No. 08719694.5.
European Search Report and the European Search Opinion Dated Nov. 29, 2010 From the European Patent Office Re. Application No. 10162182.9.
Requisition by the Examiner Dated Sep. 7, 2010 From the Canadian Intellectual Property Office Re. Application No. 2,481,643.
Response Dated Oct. 20, 2010 to Office Action of Jun. 9, 2010 From the State Intellectual Property Office of the People's Republic of China Re.: Application No. 200680017983.3.
Response Dated Nov. 22, 2010 to Notice of Reason for Rejection of Sep. 10, 2010 From the Japanese Patent Office Re. Application No. 2007-517644.
Response Dated Apr. 14, 2011 to Official Action of Dec. 17, 2010 From the US Patent and Trademark Office Re.: U.S. Appl. No. 10/510,228.

Response Dated Mar. 22, 2010 to Official Action of Feb. 22, 2010 From the US Patent and Trademark Office Re.: U.S. Appl. No. 11/596,625.
Response Dated Jun. 2, 2010 to Official Action of Jan. 15, 2010 From the US Patent and Trademark Office Re.: U.S. Appl. No. 10/510,228.
Official Action Dated Aug. 2, 2012 From the US Patent and Trademark Office Re.: U.S. Appl. No. 10/510,228.
Requisition by the Examiner Dated May 25, 2012 From the Canadian Intellectual Property Office Re. Application No. 2,566,534.
Office Action Dated May 24, 2011 From the Israel Patent Office Re. Application No. 186083 and Its Translation Into English.
Response Dated Nov. 30, 2011 to Requisition by the Examiner of Jun. 3, 2011 From the Canadian Intellectual Property Office Re. Application No. 2,481,643.
Response Dated Dec. 6, 2011 to Communication Pursuant to Article 94(3) EPC of Jul. 26, 2011 From the European Patent Office Re. Application No. 10162182.9.
Response Dated Dec. 15, 2011 to Notice of Reason for Rejection of Oct. 4, 2011 From the Japanese Patent Office Re. Application No. 2008-502561.
Official Action Dated May 2, 2012 From the US Patent and Trademark Office Re. U.S. Appl. No. 12/984,617.
Official Action Dated May 3, 2012 From the US Patent and Trademark Office Re. U.S. Appl. No. 12/984,618.
Official Action Dated Oct. 16, 2012 From the US Patent and Trademark Office Re. U.S. Appl. No. 12/984,617.
International Search Report—PCT/IB2008/050946—ISA/EPO—Dec. 16, 2008.
Neumann, J J et al., "CMOS-MEMS membrane for audio-frequency acoustic actuation", Sensors and actuators a, Elsevier sequoia S.A, Lausanne CH, vol. 95, No. 2-3, Jan 1, 2002, pp. 175-182.
Supplemental Notice of Allowability Dated Jun. 6, 2012 From the US Patent and Trademark Office Re.: U.S. Appl. No. 11/884,894.
Supplemental Notice of Allowability Dated Jun. 15, 2012 From the US Patent and Trademark Office Re.: U.S. Appl. No. 11/884,894.
Translation of Office Action Dated Jul. 4, 2012 From the State Intellectual Property Office of the People's Republic of China Re. Application No. 200880016222.5.
Translation of Notice of the Reason for Rejection Dated Aug. 21, 2012 From the Korean Intellectual Property Office Re. Application No. 2007-7024247.
Official Action Dated Aug. 20, 2012 From the US Patent and Trademark Office Re. U.S. Appl. No. 13/329,361.
Air Ultrasonic Transducer—Electrostatic Type, Pro-Wave Electronic Corp, 2003, 2 pages. http://www.prowave.com.tw/english/products/ut/es.htm.
Air Ultrasonic Transducer—Enclosed Type, Pro-Wave Electronic Corp, 2003, 2 pages. http://www.prowave.com.tw/english/products/ut/enclose.htm.
Integrated Silicon Microphone, PosiSound Series, MSM2C-RM-S3540, MEMSTECH, Oct. 29, 2007, 9 pages. http://www.memstech.com/file/MSM2C-PP-S3540.pdf.
Mimio Interactive & Mimio Studio—Specifications, Sep. 2009, 5 pages.
Mini SiSonic Microphone Specification, Knowles Acoustics, SPM0102ND3, Mar. 18, 2005, 10 pages. http://datasheet.octopart.com/SPM0102ND3-2-Knowles-Acoustics-datasheet-140178.pdf.
Mobile Notetaker—The Ultimate Handwriting Capture Device, Pegasus, Sep. 22, 2003, 2 pages.
Piezo Switches & Ultrasonic Sensors, Sensor Select, Measurement Specialties, Inc, 2007, 1 page. http://www.meas-spec.com/myMeas/sensors/piezoSensors.asp.
Precision Microphones and systems for the End User and OEM, ACO Pacific, Inc., ACOustics Begins with ACO, 2002, 4 pages. http://www.acopacific.com/acopaccat.pdf.

* cited by examiner

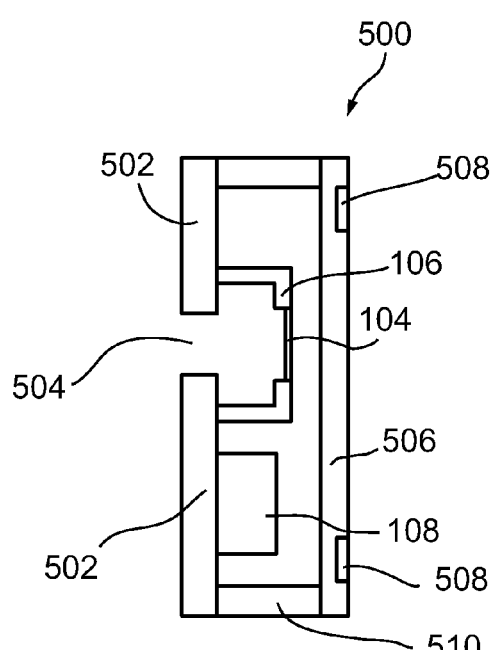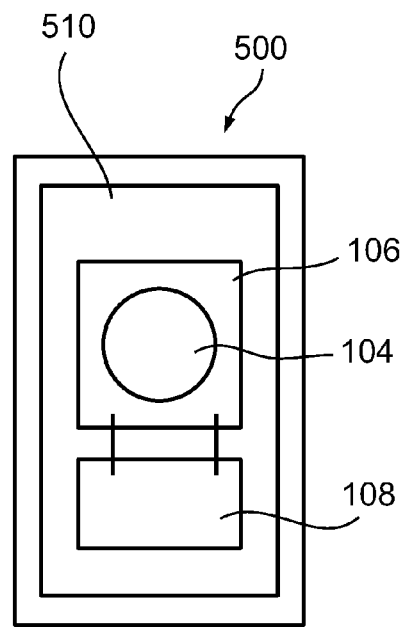
Fig. 5a
Prior Art
Fig. 5b
Prior Art
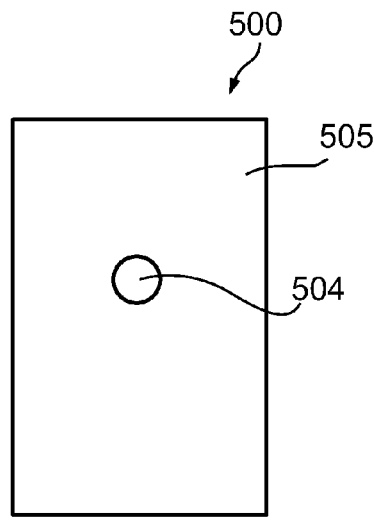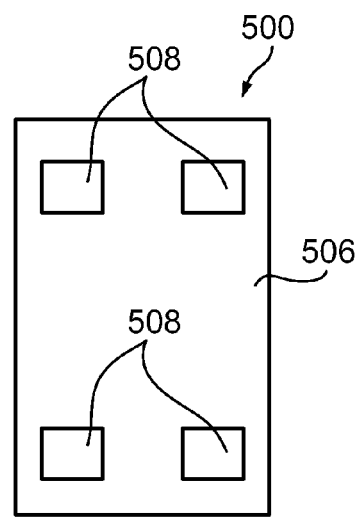
Fig. 5c
Prior Art
Fig. 5d
Prior Art

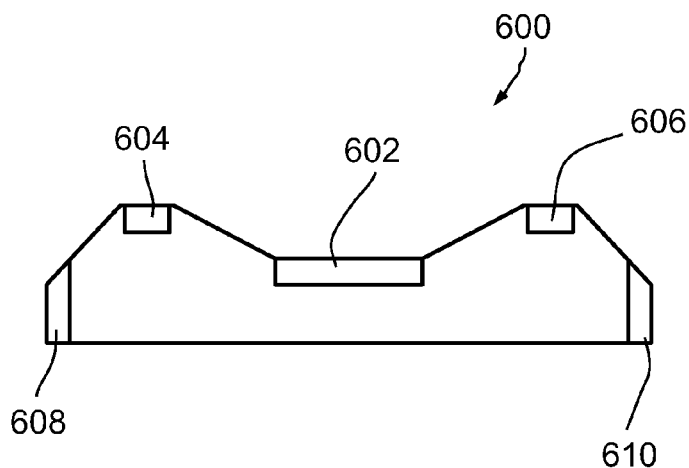
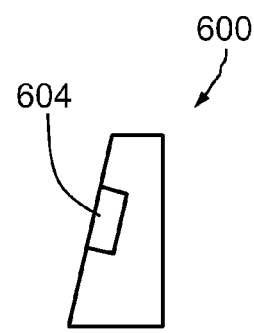
Fig. 6a          Fig. 6b
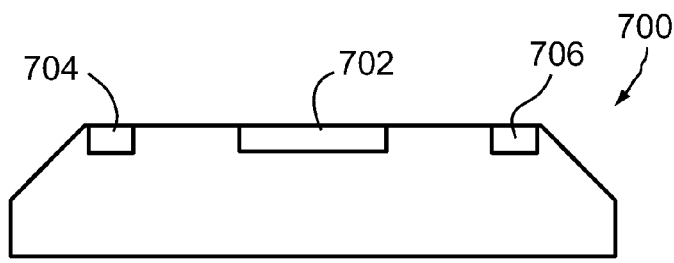
Fig. 7
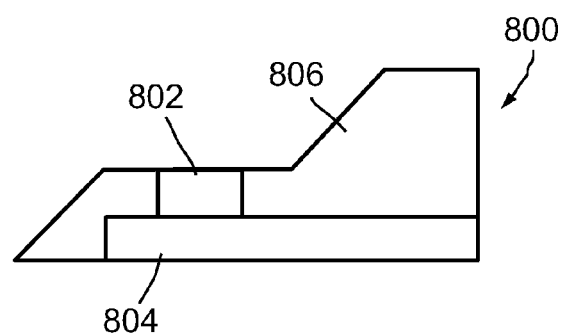
Fig. 8

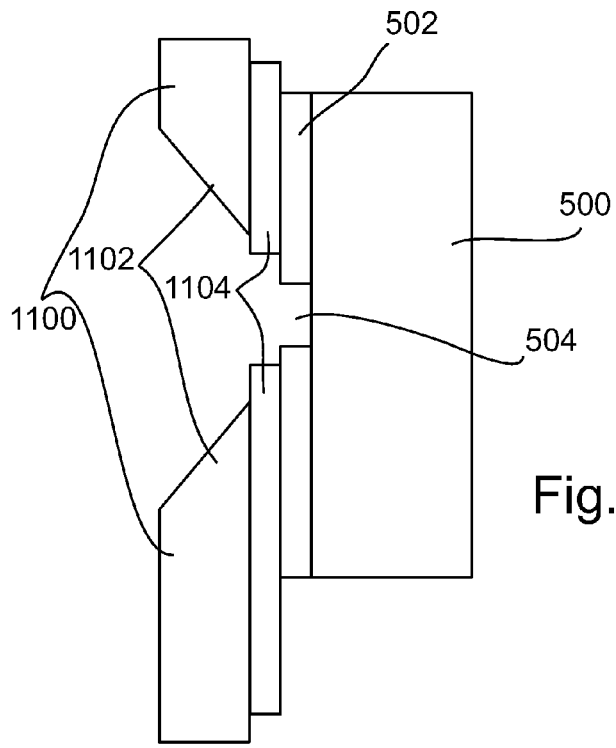
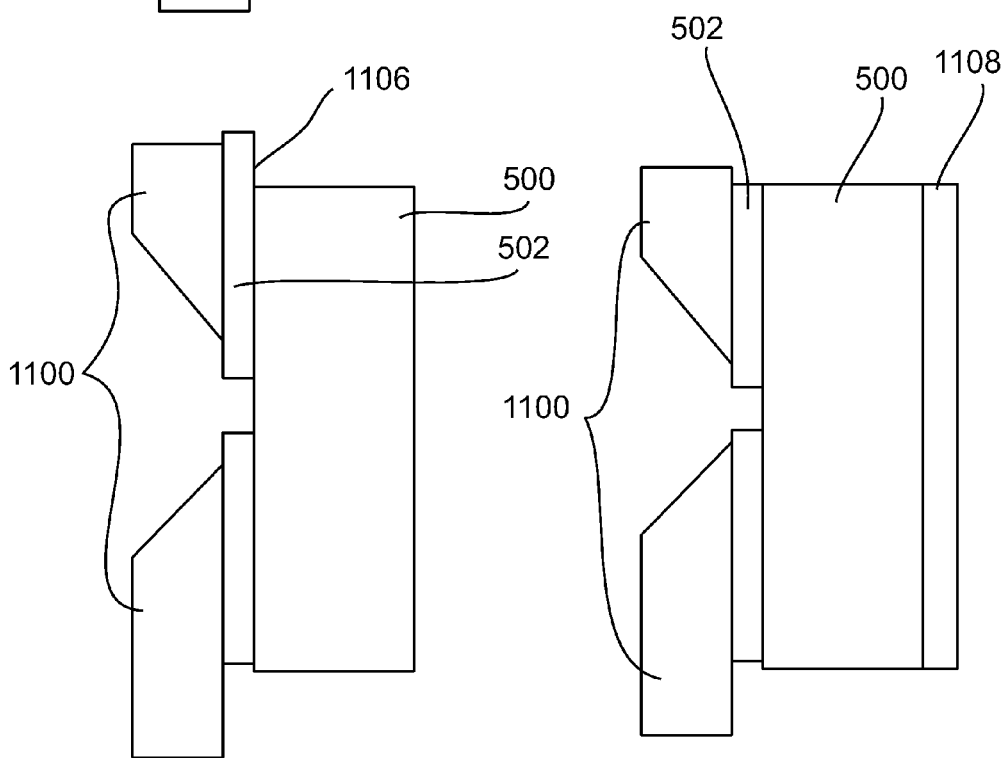
Fig. 11a
Fig. 11b    Fig. 11c

MEMS MICROPHONE

RELATED APPLICATIONS

This Application is a National Phase of PCT Patent Application No. PCT/IB2008/050946 having International filing date of Mar. 14, 2008, which claims the benefit of U.S. Provisional Patent Application No. 60/906,813 filed on Mar. 14, 2007. The contents of the above Applications are all incorporated herein by reference.

FIELD OF THE INVENTION

The present invention, in some embodiments thereof, relates to a MEMS microphone and a receiver incorporating a MEMS microphone, more particularly, but not exclusively, to an ultrasonic MEMS microphone and receiver for use in an acoustic positioning system.

BACKGROUND OF THE INVENTION

There is a need for ultrasonic sensors for use in acoustic positioning systems. It is desirable for such sensors to have reasonably broad frequency response and wide angular response (low directivity), to have output impedance and operating voltage that are not too high, to be rugged, and to be inexpensive to manufacture.

Existing ultrasonic transducers include piezo ceramic transducers, such as the Prowave 400ET080, and electrostatic transducers, such as the Prowave 500ES290. These transducers are described respectively at web pages downloaded from www.prowave.com.tw/english/products/ut/enclose.htm, and from www.prowave.com.tw/english/products/ut/es.htm, on Mar. 13, 2008. There are also ultrasonic transducers using PVDF foil, for example the MSI US40KR-01, described on a web page downloaded from www.meas-spec.com/myMeas/sensors/piezoSensors.asp, on Mar. 13, 2008, and electret microphones with ultrasonic response, such as the Aco-Pacific model 7012, described in a catalog downloaded from www.acopacific.com/acopaccat.pdf, on Mar. 13, 2008.

None of these ultrasonic sensors are completely satisfactory for use in acoustic positioning systems. Ceramic ultrasound transducers generally have relatively small bandwidth, for example 2.5 kHz (Q of 15) for a 40 kHz transducer, although some specially designed transducers with two resonance frequencies have bandwidth as high as 10 kHz. They also tend to be larger than 10 mm in diameter, comparable to or larger than a wavelength in air, so they have relatively narrow angular response. They also have high output impedance, requiring complicated electronic circuits, and they are susceptible to high temperatures, which means they require manual assembly and are relatively expensive to manufacture.

Electrostatic ultrasonic transducers also generally have low bandwidth, less than 10 kHz for a 40 kHz transducer, and are usually larger than 20 mm in diameter, so have narrow angular response. They have high output impedance, and require high voltage, typically hundreds of volts, so require relatively complicated circuitry and consume substantial power and take up a lot of space. They are also susceptible to high temperatures, so require manual assembly.

Ultrasonic transducers using PVDF also have low bandwidth, with Q of 6 to 9, diameter greater than 10 mm and narrow angular response around the z-axis of the cylindrical transducer, and high output impedance. They have relatively low sensitivity, the element is fragile and needs to be protected, and tend to pick up electronic induced noise because of the relatively high exposed surface area. Like electrostatic and ceramic transducers, they are susceptible to high temperatures, so require manual assembly.

Most electret microphones are responsive only up to about 20 kHz. The ones that have ultrasonic response, such as the Aco-Pacific model 7012, are very expensive and are generally used for lab equipment. They also have relatively high output impedance, about 2.2 kilo-ohm, though not as high as the other types of ultrasonic transducers discussed above, and are susceptible to high temperatures.

In spite of these drawbacks, there are acoustic positioning systems on the market that use ultrasound transducers. The systems sold by eBeam and Mimio, described on a web page downloaded from www.e-beam.com/products/complete.html, and by a datasheet downloaded from www.mimio.com/products/documentation/mimiointeractive_datasheet.pdf, both on Mar. 13, 2008, use ceramic ultrasound transducers. The systems sold by Pegatech, described in a datasheet downloaded on Mar. 13, 2008 from www.pegatech.com/_Uploads/Downloads/Specs/MNT/MobileNoteTaker.pdf, and by Navisis, described on a web page downloaded from www.navisis.com/ENGLISH/02_tech/principle_navisis.php?t-menu=02 on Mar. 13, 2008, use PVDF transducers. All of these products digitize handwriting to a series of coordinates, which interact with PC software. An ultrasonic transmitter is placed inside a hand held implement. The transmitter sends electronic signals which are picked up by a receiver, located near a writing area. An infrared signal synchronizes the transmitter to the receiver, using an infrared receiver incorporated into the ultrasound receiver.

MEMS microphones, which use a small and thin silicon membrane manufactured by fabrication techniques used in the semiconductor industry, are a relatively new field of technology which is rapidly gaining in market share. Their advantages include small footprint and height, ruggedness, manufacturing repeatability, and relative immunity to electrostatic and RF interference. But existing MEMS microphones are generally not sensitive to the ultrasonic range. An example is the Knowles Acoustics model SPM0102, described in a web page downloaded from www.knowles.com/search/products/m_surface_mount.jsp, on Mar. 13, 2008.

Memstech microphone model MSM2RM-S3540, described in a datasheet downloaded from www.memstech.com/file/MSM2C-RM-S3540%20Rev%20B.pdf, on Mar. 13, 2008, has a MEMS membrane and base mounted on the inner surface of the front side of a case, over an acoustic port in an otherwise substantially solid surface, with the membrane facing away from the front side, toward the back of the case.

The following patents and published patent applications also describe MEMS microphones: U.S. Pat. No. 6,522,762 to Mullenborn et al, US published applications 2004/046245 and 2002/0102004, both to Minervini, US published application 2007/0071268 and published PCT application WO 2007/022179, both to Harney et al, U.S. Pat. No. 7,301,212 to Mian et al, US published application 2007/205492 to Wang, US published application 2002/0067663 to Loeppert et al, US published application 2004/0170086 to Mayer et al, and published PCT applications WO 2007/018343 and 2007/129787, both to Song.

SUMMARY OF THE INVENTION

An aspect of some embodiments of the invention concerns a MEMS microphone that is responsive to ultrasound over a broad frequency range and with a wide angular response, as well as a receiver, suitable for an acoustic positioning system, that uses such MEMS microphones.

There is thus provided, in accordance with an exemplary embodiment of the invention, a MEMS microphone comprising:

a) a case with an open front side;
b) a MEMS membrane mounted on one face of a base, the base being mounted inside the case on a substantially closed side; and
c) a mesh covering the front side, substantially transparent acoustically to at least some of a range of operating frequencies at which the microphone is sensitive.

Optionally, the microphone also includes an amplifier mounted in the case.

Optionally, there is a first frequency greater than 25 kHz at which the microphone has a sensitivity of more than −60 dB, with 0 dB defined as 1 volt per pascal.

Optionally, the first frequency is greater than 40 kHz, or greater than 70 kHz, or greater than 100 kHz.

Optionally, the sensitivity at the first frequency is greater than −50 dB, or greater than −40 dB, or greater than −30 dB.

Optionally, the sensitivity at the first frequency is no lower than 40 dB below the sensitivity of the microphone at 20 kHz, or no lower than 30 dB below the sensitivity at 20 kHz, or no lower than 20 dB below the sensitivity at 20 kHz.

Optionally, the sensitivity at the first frequency is no lower than 40 dB below an average of the sensitivity in decibels of the frequencies between 20 kHz and the first frequency.

Additionally or alternatively, the sensitivity at the first frequency is no lower than 40 dB below maximum of the sensitivity of the frequencies between 20 kHz and the first frequency.

Optionally, the sensitivity varies by no more than 6 dB over at least 10 kHz, or over at least 20 kHz, or over at least 40 kHz, somewhere between 20 kHz and the first frequency.

Optionally, the directional sensitivity of the microphone varies by no more than 30 dB, or no more than 20 dB, for directions in front of the mesh, for the range of operating frequencies for which the sensitivity is within 40 dB of the most sensitive frequency, above 20 kHz.

In an embodiment of the invention, the substantially solid side is a back side, opposite the front side, and the base is mounted with the MEMS membrane facing the front side.

Optionally, the case does not have an interior empty volume that includes a cube 2 mm on a side, or a cube 1.5 mm on a side, or a cube 1 mm on a side.

In an embodiment of the invention, the mesh has a fill factor of less than 70%.

Optionally, substantially all the perforations in the mesh have diameter less than 0.6 mm.

Optionally, the centers of the perforations in the mesh are arranged substantially in a rhombic grid.

Optionally, for at least one frequency in the range of operating frequencies, defined as the frequencies above 20 kHz which have sensitivity within 40 dB of the most sensitive frequency above 20 kHz, and one direction in front of the mesh, the sensitivity is reduced by less than 10 dB relative to the microphone if the mesh were removed.

Optionally, for all frequencies in the range of operating frequencies, for at least one direction in front of the mesh, the sensitivity is reduced by less than 10 dB relative to the microphone if the mesh were removed.

Optionally, for at least one frequency in the range of operating frequencies, for all directions in front of the mesh, the sensitivity is reduced by less than 10 dB relative to the microphone if the mesh were removed.

Optionally, for all frequencies in the range of operating frequencies, for all directions in front of the mesh, the sensitivity is reduced by less than 10 dB relative to the microphone if the mesh were removed.

In an embodiment of the invention, the front side includes a solid area at least 1 mm square, for picking and placing.

Optionally, the front side includes a solid area for picking and placing, and the case is solidly filled in directly under the solid area.

Optionally, the membrane is less than 1 mm behind the mesh.

In an embodiment of the invention, the case has a plane of substantial symmetry, and the center of the MEMS membrane is within a distance equal to 10% of the largest diameter of the case, of the plane of substantial symmetry.

Optionally, the case comprises a flat side that the base is mounted on, with the center of the MEMS membrane aligned with the center of the flat side to within 10% of the largest diameter of the case.

Optionally, the largest dimension less than 7 mm.

Optionally, the mesh comprises a conductive material.

There is further provided, in accordance with an exemplary embodiment of the invention, an acoustic positioning system comprising:

a) a receiver comprising at least two MEM microphones, that generates a signal in response to ultrasound waves that it receives;
b) an implement that moves relative to the receiver on a positioning surface on top of which the receiver rests, and comprises at least one ultrasound transmitter that transmits ultrasound waves to the receiver; and
c) a controller that uses the signal to track a position of the implement on the positioning surface.

Optionally, the controller tracks the position of the implement to within 4 mm over an area of at least 15 cm by 20 cm, when moving at any speed less than 20 cm/sec.

Optionally, at least one microphone is mounted on the receiver so that a front side of the case is facing above horizontal, when the receiver is resting on the positioning surface.

Optionally, the front side of the microphone is facing more than 45 degrees above horizontal.

Alternatively, the front side of the microphone is facing less than 45 degrees above horizontal.

Optionally, a center of the microphone is located less than 10 mm above the positioning surface, when the receiver is resting on the positioning surface.

Optionally, a center of the microphone is located at least 1 mm above the positioning surface, when the receiver is resting on the positioning surface.

In an embodiment of the invention, at least one microphone is mounted on the receiver so that an outer surface of the microphone is substantially flush with a surface of the receiver adjacent to and surrounding the microphone.

Optionally, the surface of the receiver is substantially parallel to the outer surface of the microphone.

Optionally, a surface of the receiver, adjacent to at least one microphone, is curved convexly.

Optionally, substantially no surface of the receiver, other than a bottom surface resting on the positioning surface, is oriented in a direction below horizontal.

In an embodiment of the invention, the system also comprises at least one optical transmitter mounted on the implement, and at least one window in the receiver which receives light from the at least one optical transmitter, to synchronize the receiver with the at least one ultrasound transmitter of the implement.

Optionally, the light is infrared.

Optionally, the receiver comprises a front side with a first window of the at least one windows, and a first and second microphone of the at least two microphones arranged laterally on opposite sides of the first window.

Optionally, at least the first microphone is forward of the first window, thereby blocking a part of a field of view of the first window.

Optionally, the receiver also comprises a second window mounted on a second side of the receiver adjacent to the first microphone, the second window having a field of view that includes at least a part of the field of view of the first window blocked by the first microphone.

Optionally, the second microphone is also forward of the first window, thereby blocking a part of the field of view of the first window on an opposite side from the part blocked by the first microphone, and the receiver also comprises a third window mounted on a third side of the receiver adjacent to the second microphone, the third window having a field of view that includes at least a part of the field of view of the first window blocked by the second microphone.

Alternatively, the system also comprises at least one RF transmitter mounted on the implement, and at least one RF receiving element in the receiver which receives radio waves from the at least one RF transmitter, to synchronize the receiver with the at least one ultrasound transmitter of the implement.

In an embodiment of the invention, a front side of at least one of the microphones is directly or indirectly mounted to an inner surface of a front side of the receiver, behind a conical opening in the receiver that is less than 5 mm long, the microphone having a substantially solid front side with an acoustic port, and a MEMS membrane on a base mounted over the acoustic port on an inner surface of the front side, facing backwards.

In an embodiment of the invention, the receiver comprises a protective grill covering at least one of the microphones.

Optionally, at least one of the microphones is a microphone according to an embodiment of the invention.

Optionally, a front surface of the receiver, facing the implement anywhere in the area over which the implement is tracked, is oriented at an angle of more than 100 degrees to the positioning surface, when the receiver is resting on the positioning surface.

Optionally, the system comprises a flexible printed circuit board by which the front side of the microphone is mounted to the inner surface.

Alternatively, the front side of the microphone is directly mounted to the inner surface.

Optionally, the front side of the microphone comprises a printed circuit board which extends past the edge of the microphone by at least 1 mm, the back of the extended portion of the printed circuit board thereby providing an attachment surface for handling the microphone during assembly of the microphone to the receiver.

Optionally, the grill is symmetric with respect to horizontal reflection, when the receiver is resting on the positioning surface.

Additionally or alternatively, the grill is symmetric with respect to vertical reflection, when the receiver is resting on the positioning surface.

Optionally, a fill factor of the grill is less than 50%.

Optionally, spacing between parts of the grill is smaller than half a wavelength of ultrasound for substantially a highest frequency component of the signal used by the controller to track the position of the implement.

In an embodiment of the invention, the receiver comprises an electronics board behind at least one microphone, and an outer surface of the back of the case of the microphone comprises connections to the electronics board.

Optionally, for any frequency component of the signal used by the controller to track the position of the implement, the sensitivity of the microphone, with the grill in place, is reduced by less than 10 dB relative to the sensitivity if the grill were removed.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 2A and 2B are schematic front views of a MEMS microphone according to two different exemplary embodiments of the invention, each showing a mesh and a "pick and place" area;

FIGS. 5A-5D schematically show a side view, a back view with the back of the case removed, a front view, and a back view, of a MEMS microphone, according to the prior art;

FIGS. 6A and 6B schematically show top and side views of a receiver comprising MEMS microphones, for an acoustic positioning system, according to an exemplary embodiment of the invention;

FIG. 7 schematically shows a top view of a receiver comprising MEMS microphones, for an acoustic positioning system, according to another exemplary embodiment of the invention;

FIG. 8 schematically shows a side view of a receiver comprising MEMS microphones, for an acoustic positioning system, according to another exemplary embodiment of the invention;

FIGS. 11A-11C schematically shows side views of a MEM microphone attached to the front of a receiver for an acoustic positioning system, according to three different exemplary embodiments of the invention.

DESCRIPTION OF EMBODIMENTS OF THE INVENTION

Figure 1A:
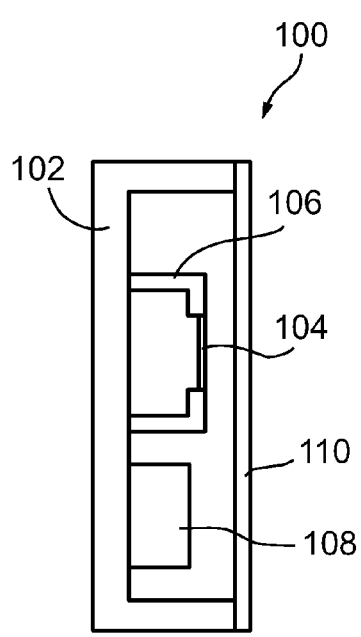
FIGS. 1A and 1B are a schematic side view and front view of a MEMS microphone, according to an exemplary embodiment of the invention, with the mesh removed from the front view.

The present invention, in some embodiments thereof, relates to a MEMS microphone and a receiver incorporating a MEMS microphone, more particularly, but not exclusively, to an ultrasonic MEMS microphone and receiver for use in an acoustic positioning system.

An aspect of some embodiments of the invention concerns a MEMS microphone, with an open case covered by a mesh, that is sensitive to ultrasound over a broad bandwidth. Although the MEMS membrane used in prior art MEMS microphones may respond to ultrasound frequencies, most prior art MEMS microphones have been designed only for auditory frequencies below 20 kHz, and are often assembled in ways that make the microphone insensitive to ultrasound, or not sensitive to a broad frequency band. Having a broad frequency bandwidth is potentially advantageous in a microphone used in an acoustic positioning system or ranging system, since position ambiguity can be removed by using a broad range of frequencies to measure the distance of a body from a microphone. Equivalently in the time domain, if the microphone has a broad bandwidth, the arrival time of a short pulse can be measured accurately, since the short pulse will not cause extended ringing of the microphone. Furthermore, having a broad bandwidth allows two or more orthogonal signals to be more easily sent simultaneously from the transmitter to the receiver, potentially resulting in a more accurate measurement.

A microphone having an open case covered by a mesh that is substantially transparent acoustically to the frequencies in an operating frequency range, will tend not to have any resonant cavities in the case, which result in a narrow bandwidth or distorted signals. The mesh optionally achieves substantial acoustic transparency by having a low enough fill factor, and perforations that are smaller than the shortest wavelength in the operating range. The mesh may also provide protection against mechanical damage, and, since it is optionally made of metal or another conductive material, against RF interference and electrostatic discharge.

In general, MEMS microphones have a number of potential advantages over other types of microphones, including greater ruggedness, better repeatability in manufacturing, lower output impedance, and, when properly designed, broader frequency response.

A MEMS microphone according to an embodiment of the invention has, for example, a sensitivity of at least −60 dB, or −50 dB, or −40 dB, or −30 dB, at a first frequency which is, for example, at least 25 kHz, or at least 30 kHz, or at least 40 kHz, or at least 70 kHz, or at least 100 kHz. Here, a sensitivity of 0 dB is defined as 1 volt per pascal. Unless otherwise stated, the sensitivity is defined for sound waves coming from a direction towards which the mesh is oriented. The sensitivity at the first frequency is, for example, less than 40 dB below the sensitivity of the microphone at 20 kHz, or below the average sensitivity, in decibels, between 20 kHz and the first frequency, or below the maximum sensitivity of any frequency between 20 kHz and the first frequency; or less than 30 dB below, or less than 20 dB below, or less than 10 dB below. Within an operating range of frequencies above 20 kHz, and optionally no higher than the first frequency, there is at least one frequency around which the sensitivity varies by less than 6 dB over 10 kHz, or over 20 kHz, or over 40 kHz, or over 80 kHz. Optionally, this operating range of frequencies is the range where the sensitivity is within 40 dB of the most sensitive frequency, above 20 kHz.

The microphone comprises a MEMS membrane mounted on a base, mounted inside the case. The case optionally also has mounted inside it an amplifier, which is defined herein as also including a pre-amplifier, or any element which generates a useful output signal for the microphone. The amplifier has an operating frequency that includes the ultrasound frequency range to which the microphone is sensitive. The output impedance of the amplifier is, for example, less than 1000 ohms, or less than 500 ohms. The microphone uses electric power at a voltage less than 10 volts, for example, or less than 5 volts.

One way by which the microphone is optionally kept sensitive to ultrasound over a broad frequency range is by avoiding, to the extent possible, having substantially enclosed cavities near the MEMS membrane, of size comparable to or greater than ultrasound wavelengths in the frequency range. For example, nowhere in the case is there an empty space which includes a cubic volume of width greater than half of a wavelength, for the highest operating frequency, for example 2 mm or 1.5 mm, or 1 mm. Such cavities can lead to narrow resonances, and/or to absorption of ultrasound.

In some embodiments of the invention, the front side of the case is not completely open, but includes a solid "pick and place" area, and a corresponding solid area on the mesh. The "pick and place area" can be used to pick up the mesh for robotic assembly onto the microphone, as well as to pick up the completed microphone for robotic assembly of a system, such as an acoustic positioning system, that uses the microphone.

The base of the MEMS membrane is optionally mounted near the center of the back side of the case, which has the potential advantage that the sensitivity of the microphone may be relatively independent of azimuthal direction. In some embodiments of the invention, the case has at least one plane of symmetry, and the base is mounted near the plane of symmetry, which has the potential advantage that the directional dependence of the sensitivity is also nearly symmetric about the plane of symmetry.

Optionally, the largest dimension of the microphone is comparable to or smaller than an ultrasound wavelength at the maximum operating frequency, or at a typical operating frequency, for example less than 7 mm, or less than 5 mm, or less than 4 mm. Having a small diameter has the potential advantage that the microphone will have relatively low directivity at that frequency, and be about equally sensitive to ultrasound coming from a broad range of directions.

An aspect of some embodiments of the invention concerns an acoustic positioning system, with a receiver that uses at least two MEMS microphones. The system also includes an implement that moves on a positioning surface, and transmits ultrasound that is received by the receiver, and used by a controller to track the position of the implement on the positioning surface. The controller is, for example, an appropriately programmed external computer, or an appropriately programmed microprocessor packaged with the receiver, or an ASIC designed to calculate the position of the implement using the microphone data. The system is used, for example, to digitize handwriting, with the implement used as a pen.

Optionally, the controller can find the location of the implement anywhere within an area that is at least 5 cm square, or at least 10 cm square, or at least 15 cm long by 20 cm wide, or at least 20 cm square, or at least 50 cm square, or at least 100 cm square, or at least 200 cm square, or at least 400 cm square, to within 2% of the width of the area, or within 1%, or within 0.5%, or within 0.2%, or within 0.1%, or within 0.05%, or within 0.02%, or within 0.01%, or within 0.005%, even when it is moving the width of the area in 1 second. Such precision of positioning is achieved, for example, by using ultrasound of frequencies in a range between 20 kHz and 80 kHz, or any of the other possible ranges mentioned above for the microphone.

Optionally, at least one of the microphones has an open case covered by an acoustically transparent mesh, as described above. Alternatively, a suitable prior art MEMS microphone is used, such as the Memstech MSM2RM-53540 microphone.

In some embodiments of the invention, there is only a single MEMS microphone, and the system is only used to find the range of the implement. In some embodiments of the invention, there are at least three MEMS microphones, and the system is used to find the position of the implement in three dimensions.

The receiver optionally rests on the positioning surface. As used herein, terms such as "up", "top", and "above," refer to a normal direction away from the positioning surface, regardless of the direction of gravity, and terms such as "below" "horizontal," and "lateral" are used relative to this definition of "up." For example, a "horizontal" direction means a direction parallel to the positioning surface, and "below the horizontal" means facing directly or at an oblique angle toward the positioning surface.

As in the design of the microphone itself, where it is potentially advantageous to avoid cavities which are resonant at ultrasound frequencies in a range of interest, in the design of the receiver it is potentially advantageous to avoid such cavities between the microphone and the incoming ultrasound waves, and to avoid geometric configurations where ultrasound can reflect from surfaces, including the positioning surface, or a surface of the receiver, and reach the microphone by multiple paths. For this reason, it may be advantageous to have one or more microphones facing upward, at least to some extent.

Optionally, at least one microphone is oriented so that its direction of greatest sensitivity is above the horizontal, by less than 30 degrees, or by between 30 and 45 degrees, or by between 45 and 60 degrees, or by more than 60 degrees, or by more than 80 degrees. Optionally, the direction of orientation of a front surface of the microphone is substantially perpendicular to the direction of greatest sensitivity, for example within 30 degrees or within 15 degrees, and optionally the microphone is substantially flush with a surface of the receiver surrounding it, for example within 5 mm or within 2.5 mm or within 1 mm, or within half a wavelength of the highest frequency transmitted by the transmitter. Optionally the surface of the microphone is substantially parallel with that surface of the receiver, for example within 30 degrees or 15 degrees.

Optionally, the receiver has no surfaces oriented downward, below horizontal, except for a bottom surface resting on the positioning surface. Optionally, the receiver has a front surface oriented in a direction above the horizontal, by less than 30 degrees, or by between 30 and 45 degrees, or by between 45 and 60 degrees, or by more than 60 degrees. Having a front surface that is oriented at an upward facing angle, the receiver tends to reflect ultrasound waves upward, so that they do not reflect back by a different path to the microphone.

Optionally, a surface of the receiver, adjacent to at least one of the microphones, is curved convexly, thereby reflecting ultrasound away from the microphone if it does not come directly toward the microphone from the implement. In some embodiments of the invention, every part of the surface of the receiver that can be within a line of sight of the transmitter in the implement when the implement is within the positioning range of the positioning surface, is either flat or convex, optionally except for features that are displaced from such a surface by less than half a wavelength of the highest frequency ultrasound transmitted, for example by less than 5 mm or 2.5 mm or 1 mm.

In some embodiments of the invention, the implement transmits light, for example infrared, and the receiver has at least one window that receives the light, in order to synchronize the ultrasound transmitter of the implement with the receiver. Alternatively, the synchronization is done by radio waves, transmitted by the implement and received by RF receiver in the receiver. In some embodiments of the invention, the implement and the receiver are not synchronized, but there is an additional microphone, which is used to determine the position of the implement even without synchronization.

Optionally, the receiver has a front side with one such window in the middle, surrounded by a microphone on each side, laterally. In some embodiments, one or both of microphones are located forward of the window, and thus partially block the field of view of the window. Optionally, there is another such window on one or both sides of the receiver that are adjacent to the front side, on the other side of the microphone, with a field of view that includes a part of the field of view that was blocked.

In some embodiments of the invention, particularly when the microphone is of the type of design that includes an acoustic port in a substantially solid front side of the case, the microphone is mounted behind a conical opening in the receiver. As used herein, "conical opening" includes an opening in the shape of a truncated portion of a cone or pyramid, such as a frustum.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Referring now to the drawings, FIG. 1A illustrates a side cross-sectional view of a MEMS microphone 100. A case 102 optionally has a solid back, optionally comprising a printed circuit board (PCB). A MEMS membrane 104 is mounted on a base 106, which is mounted on the back of case 102, and an amplifier 108 is also mounted on the back of case 102, below base 106. Case 102 is covered by a mesh 110, to be described in more detail in FIGS. 3A-3D and 4, which is designed to be largely transparent to ultrasound waves in the frequency range that the microphone is designed to receive. Optionally, MEMS membrane 104 is situated not too far behind the mesh, for example within half a wavelength of the mesh for a highest operating frequency of the microphone, or within 1 mm or the mesh, or within 0.5 mm of the mesh. Situating the MEMS membrane close to mesh 110 avoids creating a resonant volume between the mesh and the membrane, in the operating frequency range of the microphone.

Optionally, the mesh has relatively little effect on ultrasound waves passing through it, for at least part of a range of operating frequencies of the microphone. For example, compared to what the characteristics of the microphone would be if the mesh were removed, the mesh causes a loss of less than 10 dB in sensitivity of the microphone for at least one frequency in the range of operating frequencies, for sound coming from a direction of greatest sensitivity of the microphone, or for sound coming from any direction in front of the mesh. Optionally, this is true for all frequencies within an operating range of frequencies, for example between 20 kHz and 70 kHz, or any of the other ranges mentioned above. Optionally, the range of operating frequencies is the range, above 20 kHz, that has sensitivity within 40 dB of the greatest sensitivity for any frequency above 20 kHz.

The overall dimensions of microphone 100 are, for example, between 3 and 6 mm tall, between 1 mm and 2 mm thick, and between 2.5 and 5 mm wide. In an exemplary embodiment, the microphone is 4.72 mm high, 3.76 mm wide, and 1.25 mm thick, the same dimensions as the Knowles Acoustics model SPM0102 MEMS microphone.

Figure 1B:
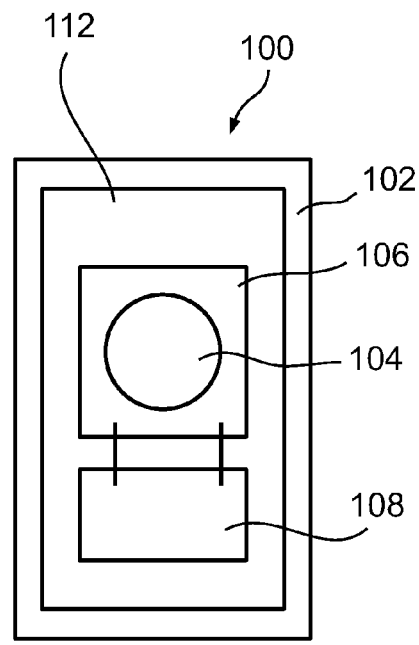

FIG. 1B shows microphone 100 from the front, with mesh 110 removed. In order for the microphone to have a broadband response to ultrasound, MEMS membrane 104 is optionally close to membrane 110. Optionally, there is relatively little empty space inside the microphone, especially near the MEMS membrane, to avoid forming resonant cavities. For example, there is no empty space big enough to hold a cube 1 mm on a side, or no empty space big enough to hold a cube 0.8 mm on a side, or no empty space big enough to hold a cube 1.2 mm on a side. Optionally, for this reason, region 112 is filled in solid. Base 106 and MEMS membrane 104 are optionally located near the center of case 102, as seen from the front, in order to avoid making the directional sensitivity of microphone 100 very dependent on azimuthal angle. The directional sensitivity of microphone 100 is also relatively independent of angle to the front surface of the microphone, because the dimensions of microphone 100 are comparable to or smaller than a wavelength of ultrasound in the frequency range for which the microphone is used.

Figure 2A:
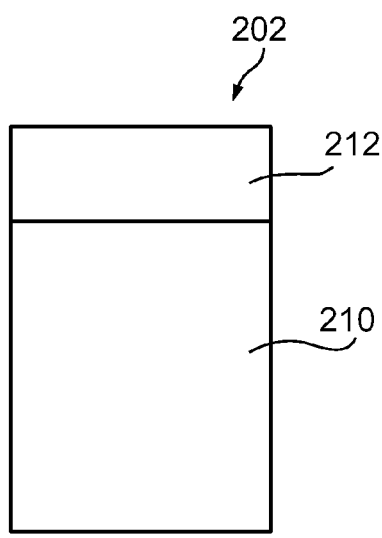
Figure 2A:
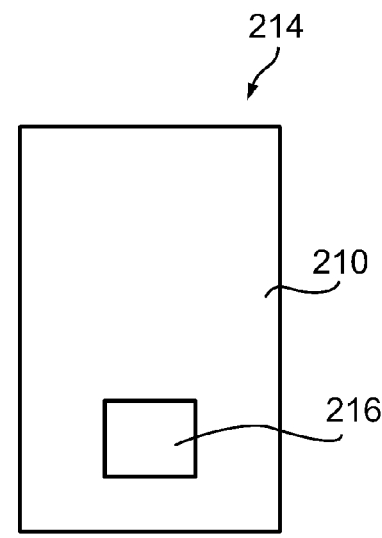

FIG. 2A is front view of a MEMS microphone 202, similar to microphone 100, with a mesh 210 covering it. Part of the front surface of microphone 202 is a solid "pick and place" area 212. Particularly if area 212 is solid, it is potentially advantageous to fill in the area underneath it, region 112 in FIG. 1B, to avoid creating a resonant cavity there. FIG. 2B shows an alternative microphone 214, with a pick and place area 216 near the bottom, over amplifier 108, for example, so that there is no resonant cavity under it. Alternatively, a pick and place area is located anywhere not substantially covering the MEMS membrane, and the volume under it is filled in. Optionally, the "pick and place" area is less than 1 mm or 2 mm in its smallest dimension, or less than 1 mm or 2 mm or 3 mm or 4 mm in its largest dimension, or covers less than 10% of the area of the front side of the microphone, or less than 20% of the area, or less than 30% of the area.

Figure 3A:
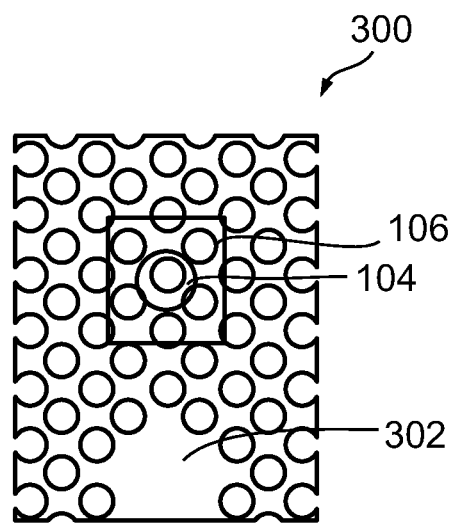
FIGS. 3A-3D schematically show a mesh for a MEM microphone, with a MEM membrane and base visible behind it, for four different exemplary embodiments of the invention, with "pick and place" areas in different locations.
Figure 3B:
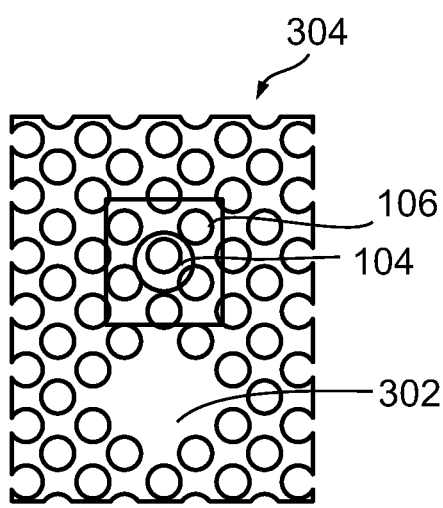
Figure 3C:
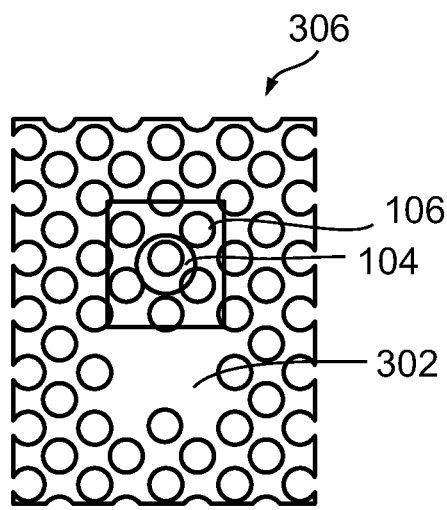
Figure 3D:
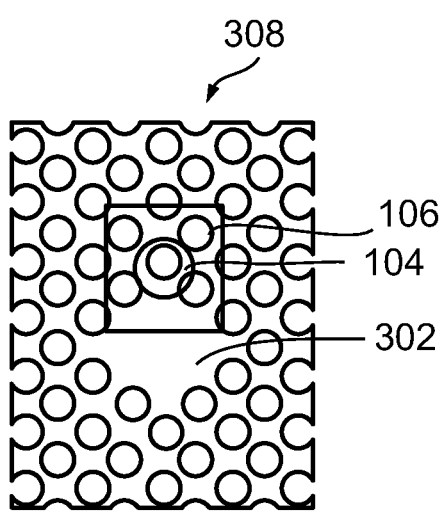

FIG. 3A shows a mesh 300 with circular perforations that can be used, for example, for microphone 214. The mesh optionally has height and width equal to the dimensions of the front of microphone 100 or microphone 202 or microphone 214, for example 4.72 mm high by 3.76 mm wide. A solid area 302, optionally 1 mm tall by 1.3 mm wide, which provides a pick and place area such as area 216, does not have any perforations. Base 106 with MEMS membrane 104 is visible behind mesh 300. FIGS. 3B, 3C, and 3D show alternative designs, with meshes 304, 306, and 308. In these meshes, area 302 is at different positions, progressively closer to the MEMS membrane.

Mesh 300, and the other mesh designs shown, are largely transparent to ultrasound waves at the frequencies of interest, because the perforations are each smaller than half a wavelength of ultrasound for the highest operating frequency, and the perforations make up a substantial fraction of the area of the mesh, about 35% in the case of mesh 300, so the fill factor is 65%. Optionally, the fill factor of the mesh is less than 70%, or less than 60%, or less than 50%, or less than 40%, or less than 30%, or less than 20%.

A wavelength of ultrasound in air at 80 kHz, for example, is about 4 mm, while the perforations in mesh 300 are 0.4 mm in diameter, which is less than half a wavelength. Optionally, the perforations are smaller in diameter than the wavelength for the highest operating frequency, divided by $2\pi$. Optionally, the perforations are smaller than 0.7 mm, or 0.6 mm, or 0.5 mm, or 0.4 mm, or 0.3 mm. The narrowest distance between perforations in mesh 300, 0.15 mm, is sufficiently great, for example, so that the mesh can be manufactured relatively inexpensively without breaking. Optionally, the mesh is thinner than a quarter of a wavelength for the highest operating frequency, for example thinner than 0.3 mm, or 0.2 mm, or 0.1 mm, or 0.05 mm.

Optionally, the perforations are circular or hexagonal or rectangular in shape, arranged, for example, with their centers in a rhombic grid, for example a square grid, or an equilateral triangular grid, like a honeycomb, or a rectangular grid.

Figure 4:
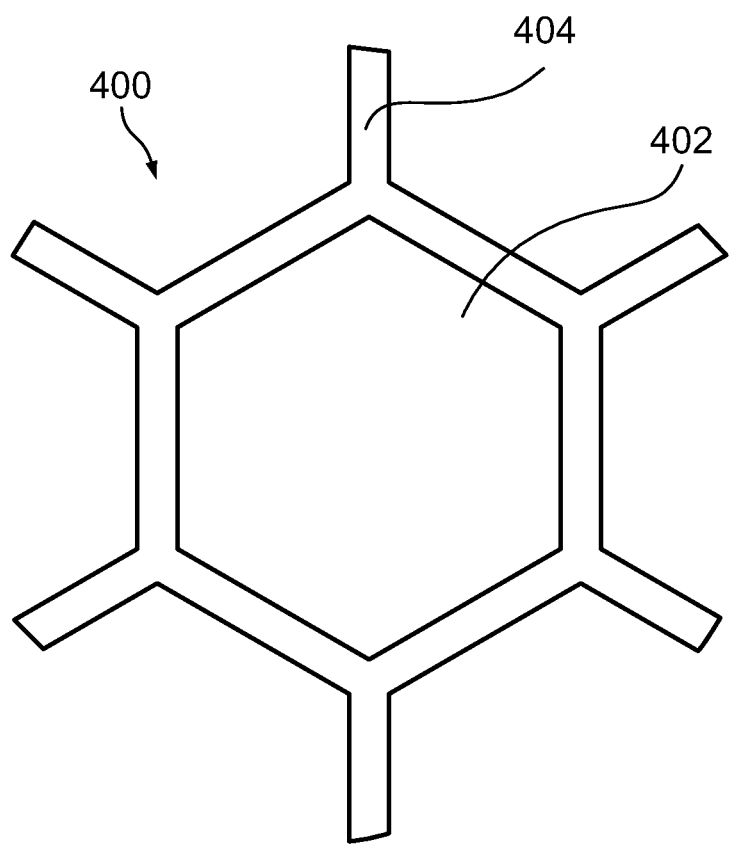
FIG. 4 schematically shows a perforation pattern for a mesh for a MEM microphone, according to an exemplary embodiment of the invention.

FIG. 4 shows part of a mesh 400, with regular hexagonal perforations arranged in a honeycomb pattern, that make up about 78% of the area of the mesh, so the fill factor is only about 22%. The hexagonal perforations are 0.4 mm in diameter, like the circular perforations in mesh 300, but the spacing between adjacent perforations is only 0.05 mm. The mesh is made, for example, out of 0.05 mm thick stainless steel. Optionally, for any of the mesh designs, there is a solid area framing the mesh, which goes over the sides of the case, for example, and a perforated area in the center. The framing area may provide mechanical strength and stiffness to the mesh, which has the potential advantage that the mesh can be more assembled to the case without breaking or becoming distorted.

FIGS. 5A-5D show a MEMS microphone 500 of an alternative, prior art, design, that is shown here because it may also be suitable for use in acoustic positioning systems as will be described below in FIGS. 11A-11C. Microphone 500 is known as an "Exox" type design, and is similar, for example, to Memstech microphone model MSM2RM-S3540. FIG. 5A shows a side view. Base 106 with MEMS membrane 104, and amplifier 108, are mounted on a front 502 of a case, substantially solid except for an acoustic port 504, optionally comprising a printed circuit board. Base 106 is mounted over acoustic port 504, with MEMS membrane 104 facing away from front side 502. Although there is an empty space inside base 106, through which ultrasound waves pass in order to reach MEMS membrane 104, this empty space does not form a resonant cavity for the frequencies of interest, because its dimensions are well below a wavelength in air for the ultrasound frequencies of interest. The case also includes a substantially solid back side 506, optionally also comprising a printed circuit board, and sides 510. Optionally, back side 506 has PCB pads 508, used to mount microphone 500 in a receiver for an acoustic positioning system, and will be described below. FIG. 5B shows a view of microphone 500 from the back, with back side 506 removed so that MEMS membrane 104, base 106, and amplifier 108 are visible. FIG. 5C shows microphone 500 from the front, with front side 502 and acoustic port 504 visible. FIG. 5D shows microphone 500 from the back, with back side 506 in place, and pads 508 visible.

FIG. 6A shows a top view of a receiver 600 for an acoustic positioning system. The system uses light, for example infrared, to synchronize the receiver with an ultrasound transmitter in an implement, not shown, whose position is being tracked. An optical window 602 is located in the center of a front side of receiver 600, which faces the implement when the positioning system is operating. Optionally, window 602 preferentially transmits the wavelengths of light, for example infrared, being used.

MEMS microphones 604 and 606 are located on each side of window 602, further forward than window 602. Placing the microphone further forward has the potential advantage that almost all ultrasound coming from the implement may reach the microphones directly, without reflecting from or interacting with the rest of receiver 600, introducing multiple paths. However, microphones 604 and 606 block part of the field of view of window 602 to the sides. Optionally, additional windows 608 and 610 are located on sides of receiver 600 adjacent to the front side, and windows 608 and 610 provide fields of view that include at least part of the field of view of window 602 that was blocked by microphones 604 and 606.

FIG. 6B is a side view of receiver 600. Optionally, the front side of receiver 600, including microphone 604, is oriented so that if faces at an oblique angle above the horizontal, for example about 30 degrees. This orientation causes ultrasound waves that reach the front side of receiver 600, but do not reach the microphones, to be reflected upward, so that they will tend not to come back to the microphones by a different path. Having a substantial fraction of the ultrasound waves reach the microphones by multiple paths from the transmitter in the implement can result in errors in tracking the position of the implement.

FIG. 7 shows a receiver 700 with a different design. In receiver 700, there is a window 702, for example an infrared window, on the front side of the receiver, surrounded by two MEMS microphones 704 and 706, but the MEMS microphones are not located forward of window 702, and do not block the field of view of window 702. There are no additional windows on the side. In other embodiments of the invention, one microphone is located forward of a first window, blocking part of its field of view, and a microphone on the other side is not located forward of the first window, and does not block its field of view. Optionally, there is an additional window on one side, for example on the side where a microphone blocks the field of view of the first window.

FIG. 8 shows a side view of a receiver 800, according to a different embodiment of the invention. In receiver 800, microphone 802 is facing substantially upward. Optionally another microphone, which is not visible because it is behind microphone 802 in the side view of FIG. 8, is also facing substantially upward. Optionally, microphone 802 is mounted on a printed circuit board 804, at the bottom of receiver 800. Because microphone 802, and optionally the other microphone as well, is relatively low down, it does block the field of view of a window, which is located higher up, for example on surface 806. Surface 806 is optionally oriented obliquely upward, so it does not reflect ultrasound back to microphone 802. Although the direction of greatest sensitivity of microphone 802 is optionally straight upward, microphone 802 still has substantially sensitivity to ultrasound coming from the side, the left side in FIG. 8, because microphone 802 has dimensions comparable to or smaller than a wavelength, so it has a wide angular field of view. Optionally, microphone 802 is designed so that it has enhanced sensitivity specifically in directions parallel to its surface, or particularly to its left side in FIG. 8. Alternatively, microphone 802 is an omnidirectional microphone.

Figure 9:
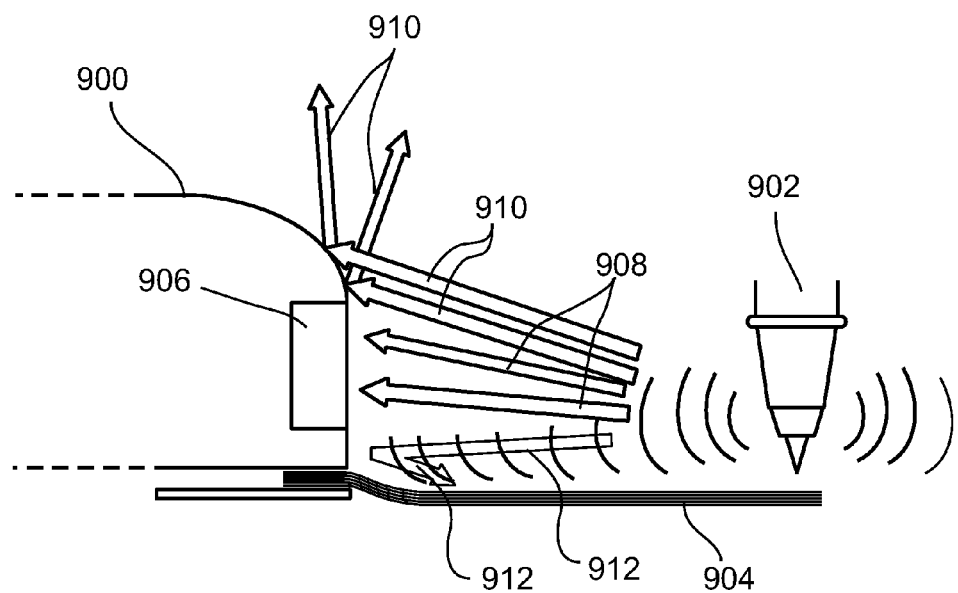
FIG. 9 schematically shows a side view of an acoustic positioning system using MEMS microphones, according to an exemplary embodiment of the invention.

FIG. 9 shows a side view of a receiver 900 for an acoustic positioning system. A writing implement 902 moves on a positioning surface 904, such as a piece of paper, and transmits ultrasound waves to a MEMS microphone 906 on a front side of receiver 900. In general, as described below for FIG. 10, there may also be a second MEMS microphone, not shown in FIG. 9 because it is not in the plane of the drawing, but is, for example, behind microphone 906.

Ultrasound waves following paths 908 reach microphone 906 directly from implement 902. Ultrasound waves following paths 910 hit receiver 900 above microphone 906, and bounce off a convexly curved portion of the front side of receiver 900, adjacent to the microphone. The convex curvature causes the reflected waves to go upward and to diverge, making it unlikely that they will ever reflect back to microphone 906, reaching the microphone by a different path from the ultrasound waves following paths 908. Ultrasound waves following path 912 also miss microphone 906, reflecting from the front side of receiver 900 below the microphone, toward positioning surface 904 and back toward implement 902.

Microphone 906 is positioned reasonably close to the bottom of receiver 900 and positioning surface 904, in order to minimize the power of any ultrasound waves finding their way back to the microphone after bouncing off the receiver below the microphone, and also in order to minimize the difference in path length between ultrasound waves that reach microphone 906 directly along paths 908, and any ultrasound waves that reach microphone 906 after bouncing off positioning surface 904. However, microphone 906 is not located too close to positioning surface 904, so that ultrasound waves may reach microphone 906 without being affected by any bumps or other irregularities in surface 904. Optionally, the center of the front surface of microphone 906, or the center of the MEMS membrane within the microphone, is located no more than 10 mm or 5 mm or 2 mm above the bottom of receiver 900, or no more than half a wavelength, for substantially the highest frequency used by the positioning system. Optionally, the center of the front surface of microphone 906, ore the center of the MEMS membrane within the microphone, is located at least 1 mm or 2 mm above the bottom of receiver 900, or above any irregularities in the positioning surface.

Optionally, the surface of microphone 906 is flush with the front side of receiver 900. This has the potential advantage that ultrasound waves reaching the front side of receiver 900 substantially do not interact with microphone 906 unless they reach microphone 906 itself. In terms of k-space, the response of microphone 906 to a plane wave of ultrasound does not depend very much on a phase difference between the wave at the microphone, and the wave at a location adjacent to the microphone, but only, at most, on a phase difference across the microphone. Since the diameter of microphone 906 is generally less than or comparable to a wavelength of ultrasound at the frequencies used by the acoustic positioning system, this means that microphone 906 has a broad angular response. To the extent that there are no important resonant cavities or other resonance effects within microphone 906, the effective size of the microphone may be only the diameter of the MEMS membrane, and the angular response may be even broader. Having a broad angular response potentially allows the positioning system to operate over a broader range of positioning surface, and/or to operate with the receiver closer to the usable area of the positioning surface, which may reduce power requirements and/or improve the precision of the system.

Figure 10:
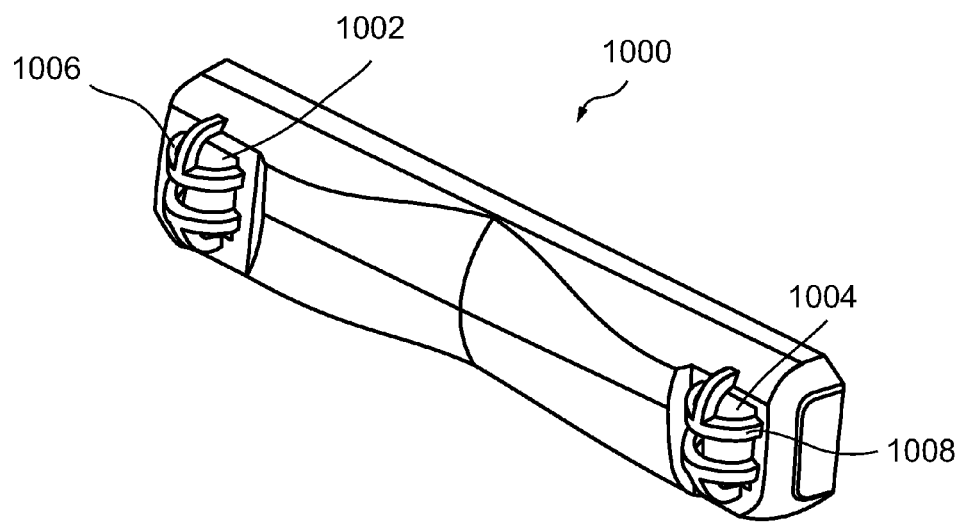
FIG. 10 schematically shows perspective view of a receiver comprising MEMS microphones, for an acoustic positioning system, according to an exemplary embodiment of the invention.

FIG. 10 shows a receiver 1000 for an acoustic positioning system, similar to receiver 900 in FIG. 9. Receiver 1000 has microphones 1002 and 1004. Having two microphones, some distance apart, makes it possible for the acoustic positioning system to determine a two-dimensional position of an implement transmitting ultrasound, by measuring a time delay or phase difference between the transmitter and each of the two microphones. Optionally, microphone 1002 has a protective grill 1006, and microphone 1004 has a protective grill 1008. Optionally, one or both grills are symmetric with respect to horizontal and/or vertical reflection, which has the potential advantage of making the directional sensitivity of each microphone more symmetric. The parts of each grill, and the spaces between them, are optionally all small compared to an ultrasound wavelength in the frequency range used by the positioning system, and the grill optionally covers a relatively small fraction of the area in front of its microphone. With these design features, the grill is largely transparent to ultrasound, and the microphone may still have the acoustic advantages of having its surface effectively flush with the surface of the receiver. In particular, the sensitivity of the microphone, to any frequency used by the controller to track the position of the implement, is reduced by the grill by less than 10 dB. The grill can protect the microphone, and in particular the MEMS membrane, from damage, for example by sharp objects. This is especially useful if the microphone is located at or near the surface of the receiver.

As defined herein, the front surface of a microphone mounted in a receiver is still considered "flush" or "substantially flush" with a surrounding surface of the receiver, even if it has a protective grill covering, if it would be flush or substantially flush in the absence of the protective grill.

FIGS. 11A, 11B and 11C show different ways of mounting a MEMS microphone 500, as described above in FIGS. 5A-5D, in a receiver for an acoustic positioning system. Microphone 500 has a front side 502, optionally made of printed circuit board, on which the base of the MEMS membrane and the amplifier are mounted. The base, inside microphone 500, is mounted over an acoustic port 504 in front side 502. In all three configurations shown in FIGS. 11A-11C, a front wall 1100 of the receiver is shown, optionally with a conical opening 1102, the apex of which is located at acoustic port 504. Optionally, the conical opening has an opening angle of at least 60 degrees, or 90 degrees, or 120 degrees. Optionally, the total length of the opening is less than half a wavelength of sound at substantially the highest frequency used by the positioning system. Using such a large opening angle and/or using such a short opening has the potential advantage that ultrasound from the implement does not reach the microphone by multiple paths, or form standing waves in the opening.

In FIG. 11A, the front side 502 of microphone 500 is mounted on another piece of flexible printed circuit board 1104, which is mounted directly on the inner surface of front wall 1100. Printed circuit board 1104 has an opening, concentric with acoustic port 504 and conical opening 1102, optionally intermediate in diameter between them, forming a relatively smooth continuation of conical opening 1102.

In FIG. 11B, front side 502 of microphone 500 is longer, with a portion 1106 extending the above upper edge of microphone 500, and front side 502 is directly mounted on the inner surface of front wall 1100.

In FIG. 11C, front side 502 of microphone 500 is directly mounted on the inner surface of front wall 1100, and there is another printed circuit board 1108 on the back side of microphone 500.

Flexible printed circuit board 1104 in FIG. 11A, extended portion 1106 in FIG. 11B, and printed circuit board 1108 in FIG. 11C, are all optionally used to help hold microphone 500 while it is being mounted, for example robotically, on the inner surface of front wall 1100. Additionally or alternatively, board 1104, extended portion 1106, and board 1108 are optionally used to provide connections between the microphone and an electronics board, not shown in the drawings, optionally located behind the microphones inside receiver 1000. The electronics board optionally comprises the controller, if it is located in the receiver, and/or a connection to an external controller, if the controller is outside the receiver, and/or a connection to a cable or wireless device for providing output of the controller.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A MEMS microphone comprising:
   a) a case with a front side open to the exterior, the case comprising an interior volume, and a closed side;
   b) a MEMS membrane mounted on one face of a base, the base being mounted inside the case on said closed side; and
   c) a mesh covering the open front side, said front side covered by said mesh being substantially transparent acoustically to at least some of a range of operating frequencies at which the microphone is sensitive, the mesh being conductive and grounded;
   wherein:
      said range comprises ultrasound frequencies and defines a highest operating wavelength; and
      said mesh includes perforations with a largest opening being less than half of said highest operating wavelength across.

2. A microphone according to claim 1, also including an amplifier mounted in the case.

3. A microphone according to claim 1, wherein there is a first frequency greater than at least one member of the group comprising 25 kHz, 40 KHz, 70 KHz, and 100 KHz, at which the microphone has a sensitivity of more than −60 dB, with 0 dB defined as 1 volt per pascal.

4. A microphone according to claim 3, wherein the sensitivity at the first frequency is one member of the group comprising: greater than −50 dB, greater than −40 dB, greater than −30 dB, no lower than 40 dB below the sensitivity of the microphone at 20 kHz, no lower than 30 dB below the sensitivity of the microphone at 20 kHz, no lower than 30 dB below the sensitivity of the microphone at 20 kHz, is no lower than 20 dB below the sensitivity of the microphone at 20 kHz, no lower than 40 dB below an average of the sensitivity in decibels of the frequencies between 20 kHz and the first frequency, and no lower than 40 dB below a maximum of the sensitivity of the frequencies between 20 kHz and the first frequency.

5. A microphone according to claim 3, wherein the sensitivity varies by one member of the group comprising: no more than 6 dB over at least 10 kHz, somewhere between 20 kHz and the first frequency, no more than 6 dB over at least 20 kHz, somewhere between 20 kHz and the first frequency, and no more than 6 dB over at least 40 kHz, somewhere between 20 kHz and the first frequency.

6. A microphone according to claim 1, wherein the directional sensitivity of the microphone varies by one member of the group comprising: no more than 30 dB, for directions in front of the mesh, for the range of operating frequencies for which the sensitivity is within 40 dB of the most sensitive frequency, above 20 kHz, and no more than 20 dB, for directions in front of the mesh, for said range of operating frequencies.

7. A microphone according to claim 1, wherein the substantially solid side is a back side, opposite the front side, and the base is mounted with the MEMS membrane facing the front side.

8. A microphone according to claim 1, wherein the mesh comprises at least one member of the group consisting of: a fill factor of less than 70%, substantially all the perforations therein having a diameter less than 0.6 mm, and the centers of the perforations therein being arranged substantially in a rhombic grid.

9. A microphone according to claim 1, wherein, for at least one frequency in the range of operating frequencies, defined as the frequencies above 20 kHz which have sensitivity within 40 dB of the most sensitive frequency above 20 kHz, and one direction in front of the mesh, the sensitivity is reduced by less than 10 dB relative to the microphone if the mesh were removed, or wherein for all frequencies in the range of operating frequencies, for at least one direction in front of the mesh, the sensitivity is reduced by less than 10 dB relative to the microphone if the mesh were removed, or wherein, for at least one frequency in the range of operating frequencies, for all directions in front of the mesh, the sensitivity is reduced by less than 10 dB relative to the microphone if the mesh were removed, or wherein for all frequencies in the range of operating frequencies, for all directions in front of the mesh, the sensitivity is reduced by less than 10 dB relative to the microphone if the mesh were removed.

10. A microphone according to claim 1, wherein the front side includes a solid area, for picking and placing, the solid area being at least one member of the group consisting of at least 1 mm square and having an area of filling of the case directly thereunder.

11. A microphone according to claim 1, wherein the membrane is less than 1 mm behind the mesh.

12. A microphone according to claim 1, wherein the case has a plane of substantial symmetry, and the center of the MEMS membrane is within a distance equal to 10% of the largest diameter of the case, of the plane of substantial symmetry, or wherein the case comprises a flat side that the base is mounted on, with the center of the MEMS membrane aligned with the center of the flat side to within 10% of the largest diameter of the case.

13. A microphone according to claim 1, with largest dimension less than 7 mm.

14. The MEMS microphone of claim 1 wherein the case does not have an interior empty volume that includes a cube 2 mm on a side.

15. The MEMS microphone of claim 14 wherein the case does not have an interior empty volume that includes a cube 1.5 mm on a side.

16. The MEMS microphone of claim 14 wherein the case does not have an interior empty volume that includes a cube 1 mm on a side.

* * * * *